(12) United States Patent
Nishinaka et al.

(10) Patent No.: US 10,717,361 B2
(45) Date of Patent: Jul. 21, 2020

(54) WORK VEHICLE AND DISPLAY DEVICE FOR THE WORK VEHICLE

(71) Applicant: Kubota Corporation, Osaka (JP)

(72) Inventors: Masaaki Nishinaka, Sakai (JP); Yukifumi Yamanaka, Sakai (JP)

(73) Assignee: Kubota Corporation, Osaka (JP)

( * ) Notice: Subject to any disclaimer, the term of this patent is extended or adjusted under 35 U.S.C. 154(b) by 91 days.

(21) Appl. No.: 15/374,205

(22) Filed: Dec. 9, 2016

(65) Prior Publication Data

US 2017/0203661 A1 Jul. 20, 2017

(30) Foreign Application Priority Data

Jan. 19, 2016 (JP) .................................. 2016-008055
Feb. 25, 2016 (JP) .................................. 2016-034384

(51) Int. Cl.
| | |
|---|---|
| *H02J 7/00* | (2006.01) |
| *B60L 11/18* | (2006.01) |
| *B60L 3/00* | (2019.01) |
| *B60L 58/20* | (2019.01) |
| *B60L 53/30* | (2019.01) |

(Continued)

(52) U.S. Cl.
CPC ......... *B60L 11/1816* (2013.01); *B60L 3/0046* (2013.01); *B60L 3/0061* (2013.01); *B60L 53/14* (2019.02); *B60L 53/20* (2019.02); *B60L 53/305* (2019.02); *B60L 58/12* (2019.02); *B60L 58/20* (2019.02); *H02J 7/007* (2013.01); *H02J 7/0013* (2013.01); *B60L 2200/22* (2013.01); *B60L 2200/40* (2013.01); *B60L 2210/10* (2013.01); *B60L 2240/441* (2013.01); *B60L 2240/445* (2013.01); *B60L 2240/545* (2013.01);

(Continued)

(58) Field of Classification Search
CPC .......................... B60L 11/1816; B60L 3/0061
See application file for complete search history.

(56) References Cited

U.S. PATENT DOCUMENTS

| | | | |
|---|---|---|---|
| 2009/0115377 A1* | 5/2009 | Schwenke ................ | B60K 6/28 320/162 |
| 2010/0134065 A1* | 6/2010 | Iida .......................... | B60L 3/12 320/103 |

(Continued)

FOREIGN PATENT DOCUMENTS

| | | |
|---|---|---|
| JP | 2012232724 A | 11/2012 |
| JP | 2011099116 A1 | 6/2013 |

(Continued)

*Primary Examiner* — Jess Whittington

(74) *Attorney, Agent, or Firm* — The Webb Law Firm

(57) ABSTRACT

A plug-in hybrid work vehicle includes a first battery charged from an on-board electric generator, a second battery charged from an external electric power source, a charging switch, a DC-to-DC converter, a voltage determination unit, and a charging control unit. During charging from the external electric power source, the charging control unit charges the second battery from the external electric power source when the voltage determination unit determines that the voltage of the first battery exceeds a reference voltage value necessary for starting an engine, and charges the first battery from the external electric power source via the DC-to-DC converter and the like, in preference to charging of the second battery, when the voltage determination unit determines that the voltage of the first battery is equal to or lower than the reference voltage value.

5 Claims, 16 Drawing Sheets

(51) Int. Cl.
*B60L 53/14* (2019.01)
*B60L 58/12* (2019.01)
*B60L 53/20* (2019.01)

(52) U.S. Cl.
CPC ....... *B60L 2250/10* (2013.01); *B60L 2250/16* (2013.01); *Y02T 10/7005* (2013.01); *Y02T 10/7044* (2013.01); *Y02T 10/7066* (2013.01); *Y02T 10/7088* (2013.01); *Y02T 10/7216* (2013.01); *Y02T 90/127* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 2012/0299377 | A1 | 11/2012 | Masuda et al. |
| 2015/0298568 | A1* | 10/2015 | Mitsutani ................ B60L 58/10 307/9.1 |
| 2015/0329001 | A1* | 11/2015 | Eifert ......................... H02J 7/34 320/109 |
| 2016/0001719 | A1* | 1/2016 | Frost ....................... H02J 7/007 307/10.1 |
| 2016/0090000 | A1* | 3/2016 | Eifert .................. B60L 11/1861 320/148 |
| 2016/0207418 | A1* | 7/2016 | Bergstrom ............... B60K 1/04 |
| 2017/0274797 | A1* | 9/2017 | Kuribara ............ B60L 11/1868 |

FOREIGN PATENT DOCUMENTS

| | | |
|---|---|---|
| JP | 2013252747 A | 12/2013 |
| JP | 2014212643 A | 11/2014 |
| JP | 2015211548 A | 11/2015 |
| WO | 2011099116 A1 | 6/2013 |

\* cited by examiner

WORK VEHICLE AND DISPLAY DEVICE FOR THE WORK VEHICLE

CROSS-REFERENCE TO RELATED APPLICATIONS

This application claims priority to Japanese Patent Applications Nos. 2016-008055 and 2016-034384, filed Jan. 19, 2016 Feb. 25, 2016, respectively, the disclosures of which are herein incorporated in their entirety by reference.

BACKGROUND OF THE INVENTION

1. Field of the Invention

The present invention is directed to a work vehicle. In more particular, the present invention is directed to, but not exclusively, a work vehicle that includes an electronic control unit that controls on-board electric components, a first battery that is charged using electric power from an on-board electric generator, and a second battery that is charged from an external electric power source via a charger.

The present invention is also directed to a display device for a work vehicle. In more particular, the present invention is directed to, but not exclusively, a display device for a work vehicle that includes a liquid crystal display provided with a plurality of display units that display information related to an engine, and a display electronic control unit that controls the operations of the liquid crystal display.

2. Description of the Related Art

[1] First Related Art

In recent hybrid work vehicles, a battery for supplying electric power to e.g. a travel oriented electric motor, may be charged with electric power from an external electric power source (e.g. see JP 2012-232724A, in particular, paragraphs 0021 and 0022 and FIGS. 1 and 5).

With a plug-in hybrid work vehicle including first and second batteries as described above, if the output voltage of the first battery is low when charging the second battery from an external electric power source, the output voltage of the first battery may fall below a reference voltage value that is necessary for starting an engine during charging of the second battery. If the output voltage of the first battery falls below the reference voltage value, the engine can no longer be started using electric power from the first battery after charging the second battery from the external electric power source. Furthermore, when an on-board electric generator is an alternator that operates on power from the engine, the first battery can no longer be charged using electric power from the alternator.

In view of the above, there is a demand to prevent the possibility that the output voltage of the first battery may fall below the reference voltage value after charging the second battery from the external electric power source.

[2] Second Related Art

Some of these work vehicles include a display device provided with an approximately four-inch liquid crystal display having a plurality of display units (display areas) for displaying engine-related information, such as an engine revolution display area that displays the number of engine revolutions, an hour meter display area that displays an accumulated period of engine operation, a coolant temperature area that displays a temperature of an engine coolant, and a fuel gauge area that displays a remaining amount of fuel to be supplied to the engine (e.g. JP 2013-252747A, in particular, paragraphs 0020, 0041 and 0042 and FIGS. 6 and 11).

Hybrid work vehicles developed in recent years include not only an engine, but also a motor generator, as its power sources. In such hybrid work vehicles, a display device needs to display not only information related to the engine, but also information related to the motor generator. This need can be fulfilled by increasing the size of a liquid crystal display along with an increase in the amount of information to be displayed. However, increasing the size of the liquid crystal display triggers an increase in the size of the display device and a significant rise in cost. Meanwhile, the size of each display unit can be reduced along with an increase in the amount of information to be displayed. However, this triggers a reduction in the visibility of information displayed on each display unit of the liquid crystal display.

In view of the above, there is a demand to develop a display device that can display not only information related to an engine, but also information related to a motor generator, without triggering an increase in the size of a display device and a significant rise in cost, or a reduction in the visibility of information to be displayed.

SUMMARY OF THE INVENTION

[1] To address the above-described issue as described in "First Related Art", one aspect of the present invention is directed to a plug-in hybrid work vehicle including: an electronic control unit that controls on-board electric components; a first battery charged using electric power from an on-board electric generator; a second battery charged from an external electric power source via a charger; a charging switch that instructs the electronic control unit to start charging from the external electric power source; and a DC-to-DC converter that converts an output voltage of the charger into a voltage corresponding to the first battery, and outputs a resultant voltage to the first battery. The electronic control unit includes a voltage determination unit that determines whether an output voltage of the first battery exceeds a reference voltage value necessary for starting an engine, and a charging control unit that controls charging of the first battery and the second battery from the external electric power source. During charging from the external electric power source, the charging control unit performs first charging control to charge the second battery from the external electric power source when the voltage determination unit determines that the output voltage of the first battery exceeds the reference voltage value, and performs second charging control to charge the first battery from the external electric power source via the DC-to-DC converter, in preference to the first charging control, when the voltage determination unit determines that the output voltage of the first battery is equal to or lower than the reference voltage value.

According to the above aspect, when an instruction to start charging from the external electric power source has been issued by the charging switch:

if the result of the determination by the voltage determination unit shows that the output voltage of the first battery exceeds the reference voltage value, then the charging control unit charges the second battery from the external electric power source by performing the first charging control; and if the result of the determination by the voltage determination unit shows that the output voltage of the first battery is equal to or lower than the reference voltage value, then the charging control unit charges the first battery from the external electric power source by performing the second charging control.

Whereby, during charging from the external electric power source, the second battery can be charged while preventing the first battery from producing an output voltage lower than the reference voltage value, even if the output voltage of the first battery was equal to or lower than the reference voltage value before the start of charging from the external electric power source, and even if the output voltage of the first battery decreased to the reference voltage value during charging from the external electric power source.

As a result, after the second battery is charged from the external electric power source, the possibility of failure to start the engine due to the first battery producing an output voltage lower than the reference voltage value can be prevented.

In a more favorable aspect of the present invention, the plug-in hybrid work vehicle further comprises a main switch that permits/interrupts application of current to the electric components including the electronic control unit, wherein the charging switch permits/interrupts application of current from the first battery to the electronic control unit, the electronic control unit further includes a permission/interruption discriminating unit that determines whether the main switch is in a blocking state for permitting application of current to the electric components, or in a connecting state for interrupting application of current to the electric components, and wherein if the permission/interruption discriminating unit determines that the main switch is in the blocking state, the charging control unit holds the charging switch in a connecting state and performs the first charging control or the second charging control, and if the permission/interruption discriminating unit determines that the main switch is in the connecting state, the charging control unit does not hold the charging switch in the connecting state and performs neither the first charging control nor the second charging control.

According to this aspect, when the main switch is in the connecting state in which current is applied to the electric components, an electric motor for traveling is in a drivable state, the engine is in an operating state, or the engine is in a startable state, meaning that the work vehicle is in, or can be shifted to, a state in which the work vehicle can travel. Therefore, even if the charging switch is manipulated to place it into the connecting state, the charging control unit does not hold the charging switch in the connecting state, thereby placing the charging switch into a blocking state and blocking the application of current from the first battery to the electronic control unit via the charging switch. Furthermore, the charging control unit performs neither the first charging control nor the second charging control, thereby preventing charging of the first battery and the second battery from the external electric power source.

On the other hand, when the main switch is in the blocking state in which current is not applied to the electric components, the electric motor for traveling is in a non-drivable state and the engine is in a non-startable state, meaning that the work vehicle cannot travel. Therefore, if the charging switch is manipulated to place it into the connecting state, the charging control unit holds the charging switch in the connecting state, thereby maintaining the application of current from the first battery to the electronic control unit via the charging switch. Furthermore, the charging control unit charges the first battery or the second battery from the external electric power source by performing the first charging control or the second charging control.

As a result, the possibility that a driver runs the work vehicle body by mistake during charging of the first battery or the second battery from the external electric power source can be prevented.

In a more favorable aspect of the present invention, a connector for external charging is provided, and the connector and the charging switch are disposed in a storage compartment that is opened and closed via a hood.

According to this aspect, charging from the external electric power source is always performed while the hood is open. Naturally, when the driver attempts to drive the work vehicle, the hood is open if the work vehicle is currently being charged from the external electric power source. This makes it easy for the driver to acknowledge whether the work vehicle is currently being charged from the external electric power source.

As a result, the possibility that the driver runs the work vehicle by mistake during charging of the first battery or the second battery from the external electric power source can be prevented more reliably.

In a more favorable aspect of the present invention, the hood is swingably openable and closable, and the connector and the charging switch are located adjacent a swing pivot of the hood in the storage compartment.

According to this aspect, during charging from the external electric power source, the open hood can function as a rain cover for the connector and the charging switch.

As a result, the connector and the charging switch can be prevented from getting wet from the rain during charging from the external electric power source with the hood open, without providing dedicated rain cover equipment.

[2] To address the above-described issue as described in "Second Related Art", one aspect of the present invention is directed to a display device for a work vehicle, the display device including: a liquid crystal display including a plurality of display units that display information related to an engine in a segmented format; and a display electronic control unit that controls operations of the liquid crystal display. The liquid crystal display includes an auxiliary display unit that is located in a free space of a display area of the liquid crystal display and that displays information related to a motor generator. The auxiliary display unit has four 7-segment display sections each corresponding to one digit. The display electronic control unit includes a control unit for the auxiliary display unit, and the control unit causes the first-digit or fourth-digit display section of the auxiliary display unit to operate as a first display section that displays a character indicating a state of the motor generator, and causes the remaining three-digit display sections to operate as second display sections that display a numeric value indicating a remaining level of a battery.

According to this aspect, the cost can be reduced compared with a case in which a dot-matrix liquid crystal display is provided.

By thus merely adding the small and inexpensive auxiliary display unit, which has four 7-segment display sections each corresponding to one digit, in the free space of the liquid crystal display, information related to the motor generator can be additionally displayed without increasing the size of the liquid crystal display and without reducing the size of each display unit.

Settings of the auxiliary display unit can be configured such that, when the motor generator is in a power running state (powering state), the first display section (first-digit or fourth-digit display section) of the auxiliary display unit displays, for example, "P," which is the initial character of "Power" easily associable with the power running state, through a control operation of the control unit. This enables the driver to acknowledge that the motor generator is currently in the power running state.

The settings can also be configured such that, when the motor generator is in a regenerating state, the first display section of the auxiliary display unit displays, for example, "C," which is the initial character of "Charge" easily associable with the regenerating state, through a control operation of the control unit. This enables the driver to acknowledge that the motor generator is currently in the regenerating state.

The settings can also be configured such that, when the motor generator is in neither the power running state nor the regenerating state, the first display section of the auxiliary display unit displays, for example, nothing through a control operation of the control unit. This enables the driver to acknowledge that the motor generator is currently in neither the power running state nor the regenerating state.

The settings can also be configured such that the second display sections (remaining three-digit display sections) of the auxiliary display unit display, for example, the remaining level of the battery in percentage through a control operation of the control unit. In this way, the driver can be notified of the remaining level of the battery.

Therefore, by merely using the liquid crystal display of an inexpensive segmented format and adding the small and inexpensive auxiliary display unit in the free space of the liquid crystal display, the information related to the engine, the state of the motor generator, and the remaining level of the battery can be favorably displayed in a manner easily visible to the driver without triggering an increase in the size of the display device and a significant rise in cost.

In a more favorable aspect of the present invention, the control unit performs flashing control, based on a power level of the motor generator, to reduce a flashing interval of the first display section as the power level increases.

According to this aspect, for example, when the motor generator is in the power running state, the higher the power level in the power running state, the shorter the flashing interval of "P" displayed on the first display section, and the quicker the flashes. Conversely, the lower the power level in the power running state, the longer the flashing interval of "P" displayed on the first display section, and the slower the flashes. In this way, the driver can be notified of the power level of the motor generator in the power running state.

On the other hand, for example, when the motor generator is in the regenerating state, the higher the power level in the regenerating state, the shorter the flashing interval of "C" displayed on the first display section, and the quicker the flashes. Conversely, the lower the power level in the regenerating state, the longer the flashing interval of "C" displayed on the first display section, and the slower the flashes. In this way, the driver can be notified of the power level of the motor generator in the regenerating state.

Hence, the power level of the motor generator in the power running state and the regenerating state can be displayed in a manner easily visible to the driver without adding a new display unit.

In a more favorable aspect of the present invention, the control unit performs display switching control, based on information from an on-board main electronic control unit, to switch a display state of the auxiliary display unit among a standard information display state for displaying the state of the motor generator and the remaining level of the battery, an abnormality information display state for displaying an abnormality in an electric system including the motor generator, and a maintenance information display state for displaying information necessary for maintenance of the electric system.

According to this aspect, upon detecting an abnormality in, for example, the motor generator or the battery based on information from the main electronic control unit, the control unit switches the display state of the auxiliary display unit from the standard information display state to the abnormality information display state. The settings can be configured such that, in the abnormality information display state, the auxiliary display unit displays, for example, "Er01" showing the abbreviation of "Error" and a two-digit error code corresponding to the substance of the current abnormality through a control operation of the control unit. In this way, the driver can be notified of the fact that the electric system is currently undergoing an abnormality, as well as the substance of the current abnormality.

Upon detecting that a vehicle body has been manipulated to switch from a normal driving mode to a maintenance mode for performing maintenance on the electric system, for example, the motor generator or the battery, based on information from the main electronic control unit, the control unit switches the display state of the auxiliary display unit from the standard information display state to the maintenance information display state. The settings can be configured such that, in the maintenance information display state, the auxiliary display unit displays, for example, "Sa03" showing a sensor identifier and an AD value through a control operation of the control unit. In this way, the driver can be notified of information necessary for maintenance of the electric system.

Thus, the driver can be appropriately notified of an abnormality in the electric system and information necessary for maintenance without adding a new display unit.

In a more favorable aspect of the present invention, the liquid crystal display is disposed on a dashboard with a sideways distance from an area in which a steering wheel obstructs a driver's field of view, and the auxiliary display unit is located at an end portion of the liquid crystal display closer to the steering wheel.

According to this aspect, various types of information displayed on the liquid crystal display can easily be viewed by the driver without getting obstructed by the steering wheel.

On the liquid crystal display, the auxiliary display unit is located close to the driver. Therefore, notwithstanding the arrangement of the small auxiliary display unit in the free space of the liquid crystal display, information related to the electric system displayed on the auxiliary display unit can easily be viewed by the driver.

In a more favorable aspect of the present invention, the auxiliary display unit has a battery symbol indicating the battery, and the control unit performs symbol flashing control to make the battery symbol flash when the remaining level of the battery has fallen below a setting value.

According to this aspect, merely adding the battery symbol to the auxiliary display unit enables the driver to acknowledge that the remaining level of the battery has fallen below the setting value.

In a more favorable aspect of the present invention, each of a first setting value and a second setting value, that is smaller than the first setting value, is set as the setting value, and in the symbol flashing control, the control unit makes a flashing interval of the battery symbol shorter when the remaining level of the battery has fallen below the second setting value than when the remaining level of the battery has fallen below the first setting value.

According to this aspect, by merely setting the first and second setting values each as the setting values, the driver can be notified of lowering of the battery in two steps.

This enables a clearer presentation of the degree of lowering of the battery to the driver.

In a more favorable aspect of the present invention, an on-board main electronic control unit has an electric mode for driving a travel device using power from the motor generator alone as a travel drive mode, the liquid crystal display includes a revolution display unit that has four 7-segment display sections each corresponding to one digit and that displays a numeric value indicating the number of engine revolutions, and the display electronic control unit includes a display switching unit that switches a display state of the revolution display unit. Here, upon selection of the electric mode, the display switching unit switches the display state of the revolution display unit from a standard display state for displaying the number of engine revolutions to an auxiliary display state for displaying one or more characters indicating that the electric mode is in effect, and upon cancellation of the selection of the electric mode, the display switching unit switches the display state of the revolution display unit from the auxiliary display state to the standard display state.

According to this aspect, for the duration of selection of the electric mode, the revolution display unit is in the auxiliary display state. Settings can be configured such that, in the auxiliary display state, the revolution display unit displays, for example, "ELEC" or "batt," which is the abbreviation of "ELECTRIC" or "battery" easily associable with the electric mode, through a control operation of the display switching unit. This enables the driver to acknowledge that the current travel drive mode is the electric mode.

On the other hand, for the duration of cancellation of selection of the electric mode, the revolution display unit is in the standard display state. In the standard display state, the revolution display unit displays a numeric value indicating the number of engine revolutions through a control operation of the display switching unit. This enables the driver to acknowledge that the current travel drive mode is not the electric mode.

In other words, by efficiently using the revolution display unit that becomes unnecessary in the electric mode, the driver can be notified of whether the travel drive mode is the electric mode without adding a new display unit.

In a more favorable aspect of the present invention, a coolant temperature symbol indicating a temperature of an engine coolant and a cell temperature symbol indicating a temperature of battery cells are located adjacent to a temperature display unit, a refueling symbol indicating refueling and a charging symbol indicating charging are located adjacent to a remaining amount display unit, and the display electronic control unit includes a symbol switching unit that switches symbols to be displayed. Here, in an on-board state in which the information related to the engine is obtainable, the symbol switching unit hides the cell temperature symbol and the charging symbol and displays the coolant temperature symbol and the refueling symbol, and in an on-board state in which the information related to the engine is unobtainable, the symbol switching unit hides the coolant temperature symbol and the refueling symbol and displays the cell temperature symbol and the charging symbol.

According to this aspect, for example, when the work vehicle includes only the engine as its power source, or includes the engine and the motor generator as its power sources, the on-board state in which the information related to the engine is obtainable is in effect, and thus the symbol switching unit hides the cell temperature symbol and the charging symbol, and displays the coolant temperature symbol and the refueling symbol. This enables the driver to acknowledge that information displayed on the temperature display unit indicates a temperature of the engine coolant and information displayed on the remaining amount display unit indicates a remaining amount of fuel. Thus, the driver can be notified of the temperature of the engine coolant and the remaining amount of fuel.

On the other hand, for example, when the work vehicle includes only the electric motor or the motor generator as its power source, the on-board state in which the information related to the engine is unobtainable is in effect, and thus the symbol switching unit hides the coolant temperature symbol and the refueling symbol, and displays the cell temperature symbol and the charging symbol. This enables the driver to acknowledge that information displayed on the temperature display unit indicates a temperature of the battery cells, and information displayed on the remaining amount display unit indicates a remaining level of the battery. Thus, the driver can be notified of the temperature of the battery cells and the remaining level of the battery.

In other words, a single display device is commonly mountable on an engine work vehicle, a hybrid work vehicle, and an electric work vehicle.

This is advantageous in terms of, for example, cost and management of components compared with a case in which different types of work vehicles are respectively provided with display devices specifically tailored thereto.

Other aspects and advantages derived therefrom will be apparent after reading following description with reference to the drawings.

BRIEF DESCRIPTION OF THE DRAWINGS

FIGS. 1-7 show a first embodiment, in which:

FIG. 1 is a left side view of a multipurpose work vehicle;

FIG. 2 is a plan view of the multipurpose work vehicle;

FIG. 3 is a rear view of a boarding/driving section showing the arrangement of a change speed lever, a changeover switch, etc.;

FIG. 4 is a block diagram showing a part of a control configuration of the multipurpose work vehicle;

FIG. 5 is a circuit diagram showing a schematic configuration of a charging circuit for an external electric power source;

FIG. 6 is a flowchart of external charging control; and

FIG. 7 is a perspective view of primary components showing the arrangement of a connector and charging switch, etc.; and FIGS. 8-23 show a second embodiment, in which:

FIG. 8 is a left side view of a multipurpose work vehicle;

FIG. 9 is a plan view of the multipurpose work vehicle;

FIG. 10 is a rear view of a boarding/driving section showing the arrangement of a display device, a change speed lever, etc.;

FIG. 11 is a block diagram showing a part of a control configuration of the multipurpose work vehicle;

FIG. 12 is a front view of the display device;

FIG. 13 is a front view of primary components of a liquid crystal display unit showing a display state of an auxiliary display unit in a power running state;

FIG. 14 is a front view of primary components of a liquid crystal display unit showing a display state of the auxiliary display unit in a regenerating state;

FIG. 15 is a front view of primary components of a liquid crystal display unit showing a display state of the auxiliary display unit in neither the power running state nor the regenerating state;

FIG. 16 is a front view of primary components of a liquid crystal display unit showing an abnormality information display state of the auxiliary display unit;

FIG. 17 is a front view of primary components of a liquid crystal display unit showing a maintenance information display state of the auxiliary display unit;

FIG. 18 is a front view of primary components of a liquid crystal display unit showing a standard display state of a revolution display unit;

FIG. 19 is a front view of primary components of a liquid crystal display unit showing an auxiliary display state of the revolution display unit;

FIG. 20 is a front view of primary components of a liquid crystal display unit showing a distance display state of a cumulative display unit;

FIG. 21 is a front view of primary components of a liquid crystal display unit showing a period display state of the cumulative display unit;

FIG. 22 is a front view of primary components of liquid crystal display units according to a variation (18), in which a temperature display unit displays a temperature of an engine coolant, and a remaining amount display unit displays a remaining amount of fuel; and FIG. 23 is the front view of primary components of liquid crystal display units according to the variation (18), in which the temperature display unit now displays a temperature of battery cells, and the remaining amount display unit now displays a remaining level of a battery.

DETAILED DESCRIPTION OF PREFERRED EMBODIMENTS

First Embodiment

A first embodiment will be described hereinafter with reference to FIGS. 1-7. In the first embodiment, a plug-in hybrid multipurpose work vehicle is illustrated as an example of a plug-in hybrid work vehicle.

Figure 1:
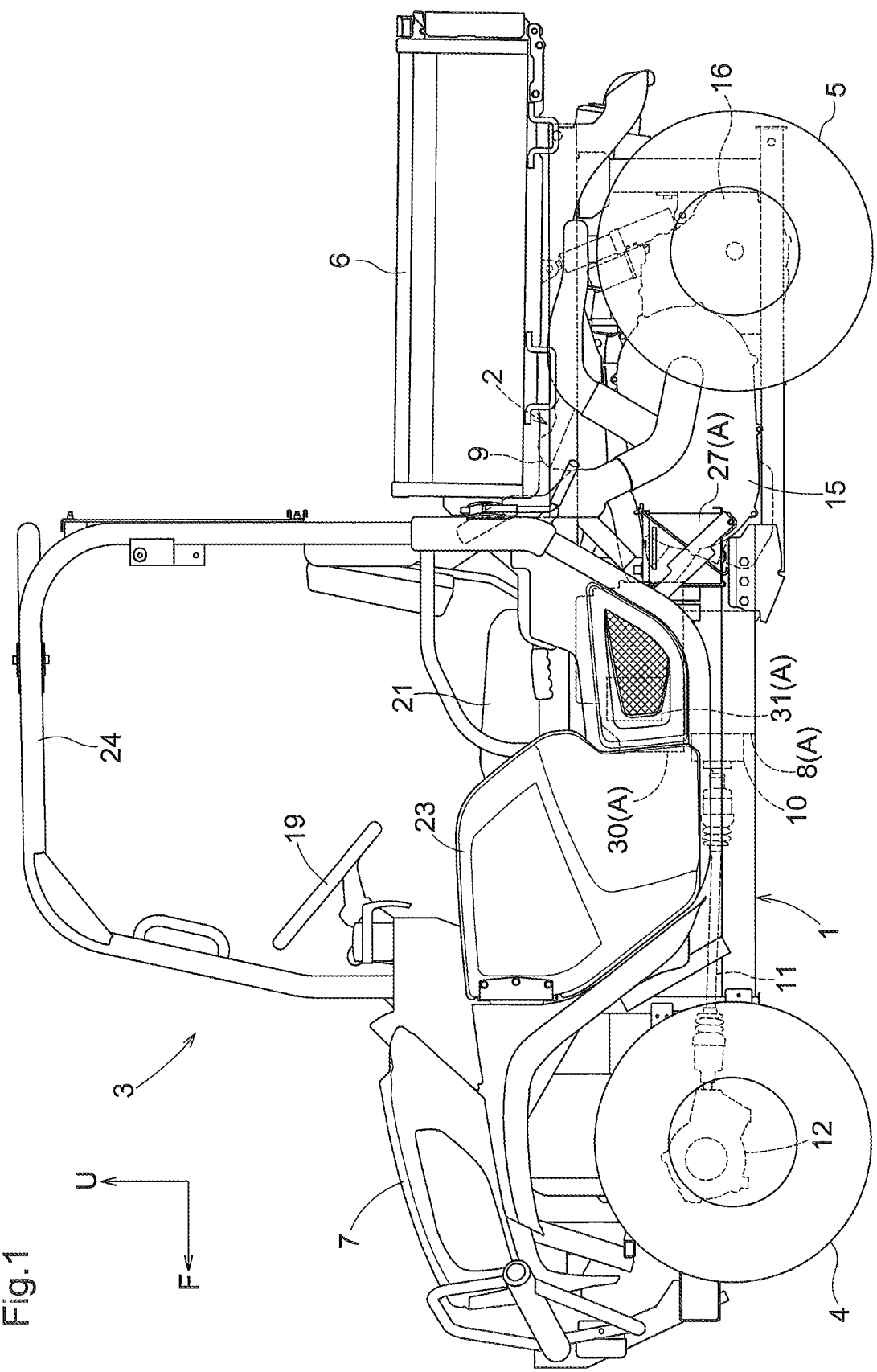
Figure 2:
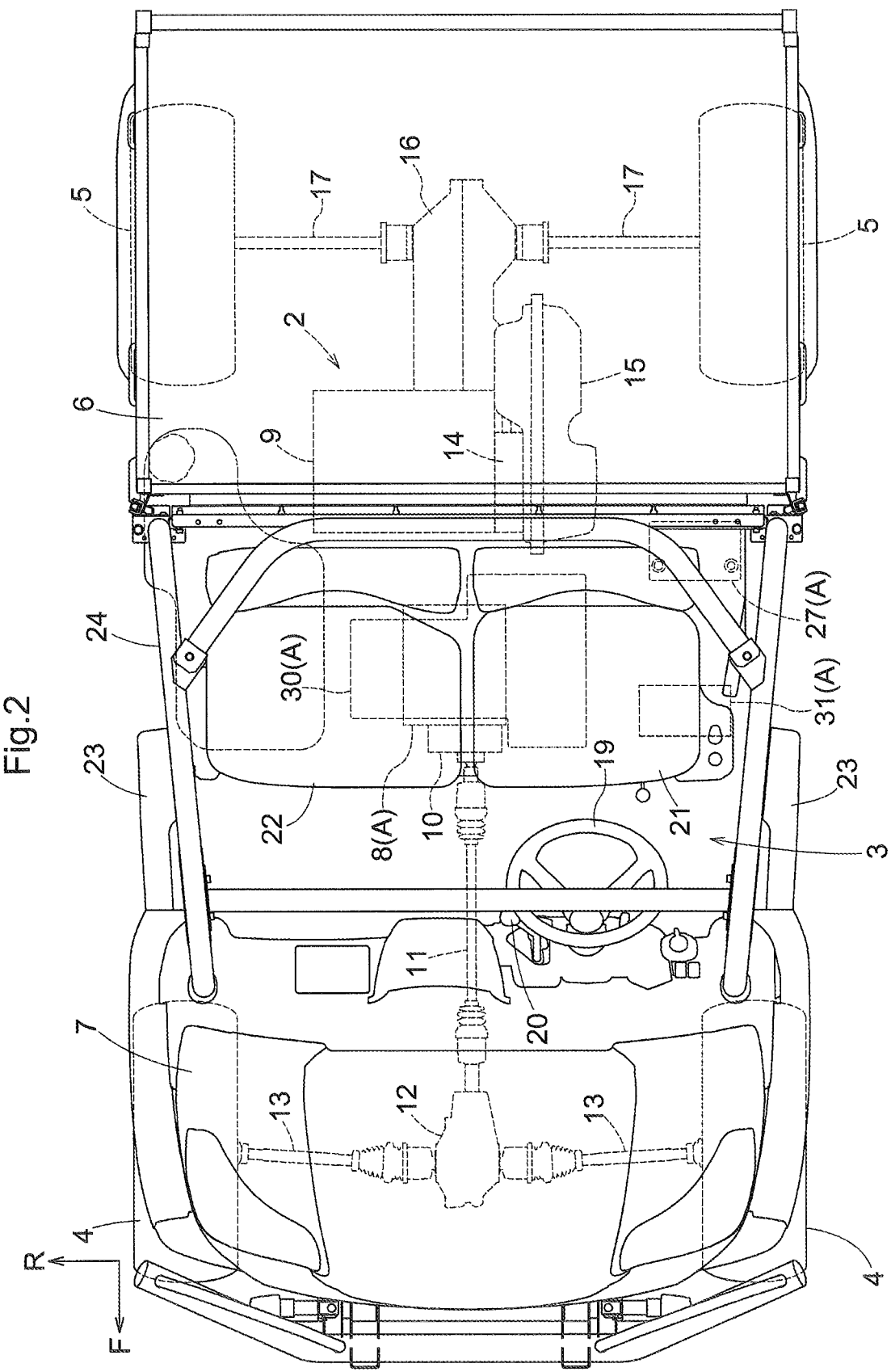

In the following description, as shown in FIG. 1, the direction of arrow "F" points the front side of the multipurpose work vehicle, whereas the direction of arrow "U" points the upper side of the multipurpose work vehicle. As shown in FIG. 2, the direction of arrow "F" points the front side of the multipurpose work vehicle, whereas the direction of arrow "R" points the right side of the multipurpose work vehicle.

With reference to FIGS. 1 and 2, the multipurpose work vehicle exemplarily described in the present embodiment includes: a vehicle body frame 1 that constitutes a frame of a vehicle body; a prime mover unit 2 and two-passenger boarding/driving section 3 that are located at a central portion of the vehicle body in the front-rear direction; left and right front wheels 4 that are steerable and driven by power from the prime mover unit 2; left and right rear wheels 5 driven by power from the prime mover unit 2; a load bed 6 that is joined to a rear portion of the vehicle body in a vertically swingable manner; a swingably openable and closable hood 7, etc.

The prime mover unit 2 includes an electric motor 8 for traveling (one example of electric components A) that supplies power to the left and right front wheels 4, and a gasoline engine (referred to as "engine" hereinafter) 9 that supplies power to the left and right rear wheels 5. Power from the electric motor 8 is transmitted to the left and right front wheels 4 via a gear-type speed reduction device 10, a first drive shaft 11, a differential device 12, and left and right second drive shafts 13, etc. Power from the engine 9 is transmitted to the left and right rear wheels 5 via a centrifugal clutch 14, a belt-type continuously variable transmission device 15, a gear-type transmission device 16, and left and right third drive shafts 17, etc.

Although not shown, a casing of the transmission device 16 houses a transmission mechanism, a differential mechanism, left and right brakes, etc. The transmission mechanism switches power from the engine 9 between forward travel power and reverse travel power, and further switches between two speeds (high and low) of the forward travel power.

Figure 3:
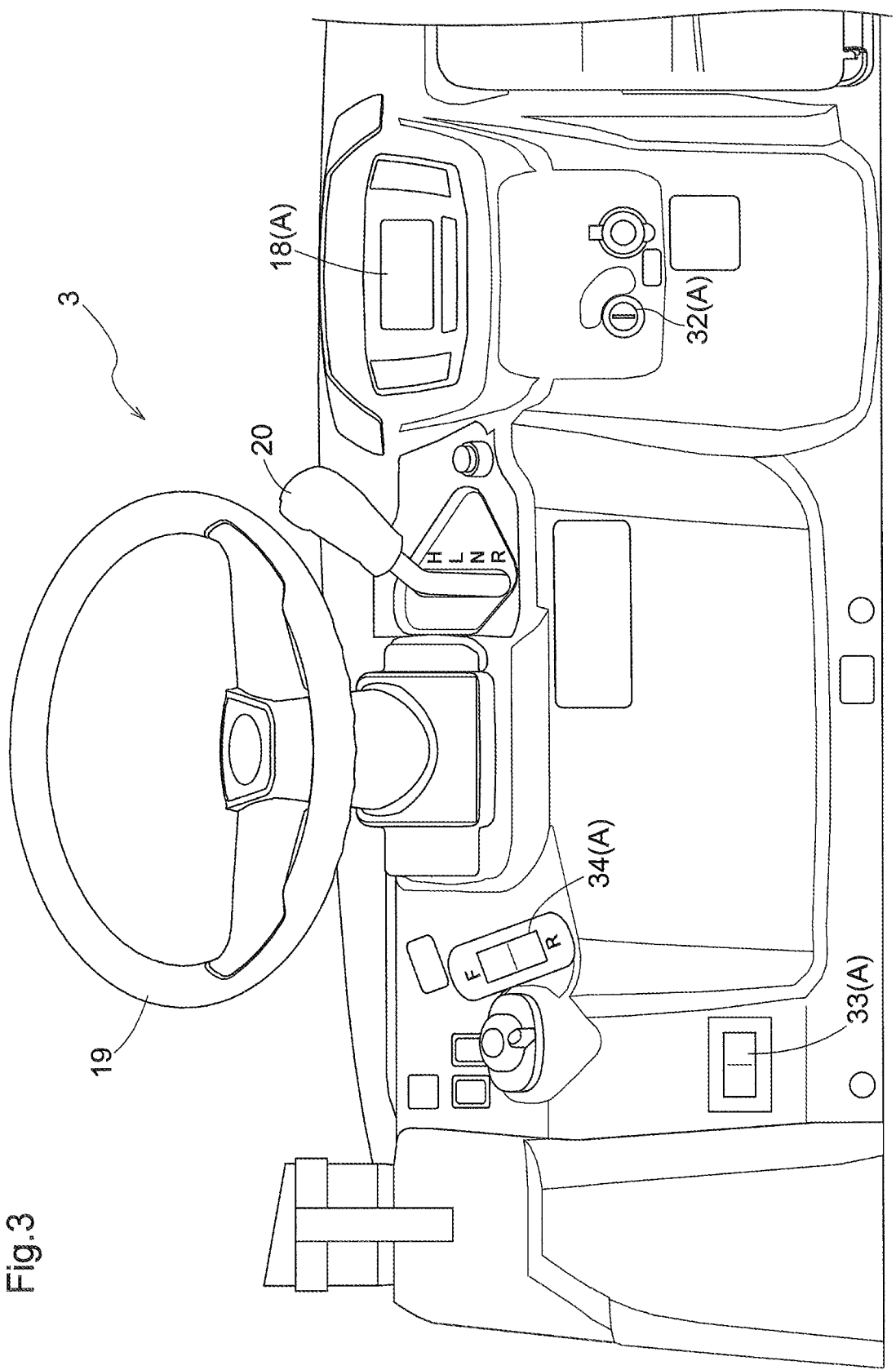

As shown in FIGS. 1 to 3, the boarding/driving section 3 includes a liquid crystal display panel 18 (one example of the electric components A), a steering wheel 19 for steering the left and right front wheels 4, a change speed lever 20 that is swingable in the front-rear direction, a driver's seat 21 on the left side, a passenger's seat 22 on the right side, left and right doors 23, a protection frame 24, etc. The change speed lever 20 can be switched among and held at a neutral position N, a low-speed forward travel position L that is closer to the front side of the vehicle body than the neutral position N is, a high-speed forward travel position H that is closer to the front side of the vehicle body than the low-speed forward travel position L is, and a reverse travel position R that is closer to the rear side of the vehicle body than the neutral position N is. The change speed lever 20 is operatively linked to the transmission mechanism via e.g. control cables (not shown).

Figure 4:
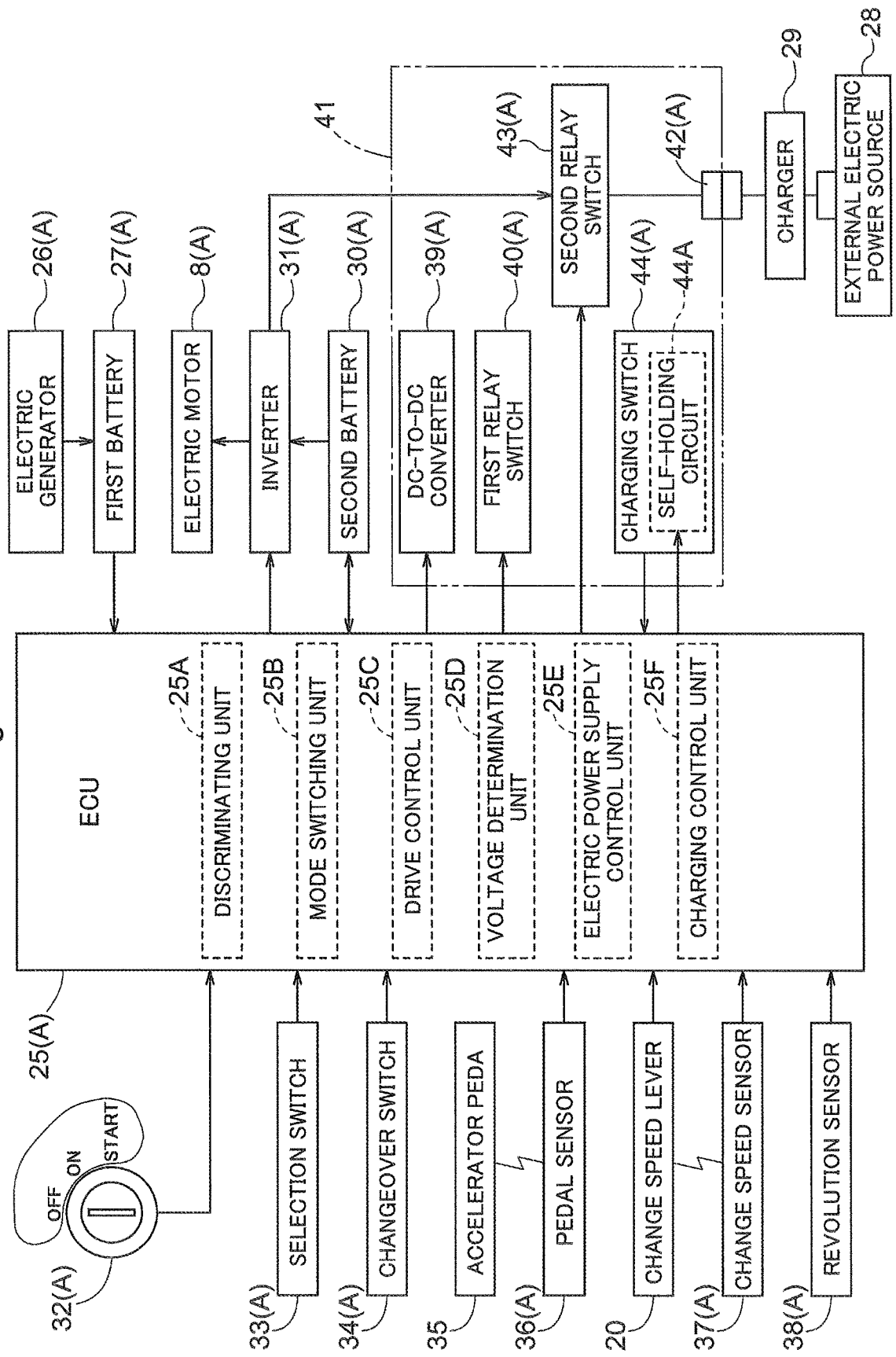

As shown in FIGS. 1, 2 and 4, this multipurpose work vehicle includes an electronic control unit (referred to as "ECU" hereinafter) 25 that controls the on-board electric components A, a first battery 27 (one example of the electric components A) that is charged using electric power from an on-board electric generator 26 (one example of the electric components A), and a second battery 30 (one example of the electric components A) that is charged from an external electric power source 28, which is a commercial power source, via a charger 29, etc.

The ECU 25 is comprises a microcomputer including a CPU (central processing unit), an EEPROM (electrically erasable programmable read-only memory), etc. The ECU 25 and electric components A are connected such that communication or electric power transmission can be performed therebetween via in-vehicle communication, such as a controller area network (CAN) and/or an electric power line. The electric generator 26 is an alternator that generates alternating-current electricity using power from the engine 9, and converts the alternating-current electricity into direct-current electricity using a rectifier. The first battery 27 is a 12-volt lead-acid battery that supplies electric power to 12-volt electric components A, including the ECU 25. The second battery 30 is a 48-volt lithium-ion battery that supplies electric power to the electric motor 8, which is a 48-volt electric component A. The second battery 30 includes a management system that monitors the voltage, current, temperature and the like of the second battery 30; and upon detecting an abnormality of any one thereof, the management system protects the second battery 30 by restricting or suspending its charging and/or discharging. The electric motor 8 is an alternating-current motor that is operable under alternating-current electric power supplied from the second battery 30 via an inverter 31 (one example of the electric components A).

As shown in FIGS. 3 and 4, this multipurpose work vehicle includes a key switch 32 (one example of the electric components A) that acts as a main switch for permitting/interrupting application of current to the electric components A, including the ECU 25. The key switch 32 can be shifted to an "OFF" position, "ON" position and "START" position; and can be held at the "OFF" position and "ON" position. Upon shifting to the "START" position, the key switch 32 is urged to return to the "ON" position. When manipulated to the "OFF" position, the key switch 32 enters a blocking state for blocking the application of current from the batteries 27, 30 to the electric components A. When manipulated to the "ON" position, the key switch 32 enters a connecting state for applying current from the batteries 27, 30 to the electric components A. When manipulated to the "START" position, the key switch 32 instructs the ECU 25 to start the engine 9 while maintaining the connecting state.

Although not shown, the ECU 25 transmits the engine start instruction from the key switch 32 to an electronic control unit for engine control (referred to as "E-ECU" hereinafter). Based on the engine start instruction, the E-ECU performs engine start control to start the engine 9 by bringing a starter motor (one example of the electric components A) and the like into operation. The E-ECU comprises a microcomputer including a CPU, EEPROM, etc.

As shown in FIGS. 3 and 4, the ECU 25 includes: a discriminating unit 25A that determines the manipulated position of the key switch 32; a travel-oriented mode switching unit 25B (referred to as "mode switching unit 25B" hereinafter) that switches among different types of travel drive modes; and a travel-oriented drive control unit 25C (referred to as "drive control unit 25C" hereinafter) that controls the operations of the electric motor 8. The ECU 25 has following types of travel drive modes: an electric two-wheel drive mode for driving the left and right front wheels 4 using power from the electric motor 8, an engine two-wheel drive mode for driving the left and right rear wheels 5 using power from the engine 9, and a hybrid four-wheel drive mode for driving the left and right front wheels 4 and the left and right rear wheels 5.

Upon detecting shifting of the key switch 32 from the "OFF" position to the "ON" position based on information from the discriminating unit 25A, the mode switching unit 25B switches the travel drive mode to the electric two-wheel drive mode.

Upon detecting shifting of the key switch 32 from the "ON" position to the "START" position based on information from the discriminating unit 25A, the mode switching unit 25B switches to a drive mode selected by manipulation of a selection switch 33 (one example of the electric components A) that is provided in the boarding/driving section 3 for drive mode selection. The selection switch 33 can switch between a first state for selecting the engine two-wheel drive mode, and a second state for selecting the hybrid four-wheel drive mode. When the selection switch 33 is in the first state, the mode switching unit 25B switches the travel drive mode to the engine two-wheel drive mode. When the selection switch 33 is in the second state, the mode switching unit 25B switches the travel drive mode to the hybrid four-wheel drive mode.

In this way, a driver can select the electric two-wheel drive mode as the travel drive mode by manipulating the key switch 32 from the "OFF" position to the "ON" position, thereby enabling the vehicle body to travel without bringing the engine 9 into operation. On the other hand, when the engine 9 is in operation as a result of manipulating the key switch 32 from the "ON" position to the "START" position, the driver can switch the travel drive mode between the engine two-wheel drive mode and the hybrid four-wheel drive mode by manipulating the selection switch 33.

In the electric two-wheel drive mode, the drive control unit 25C controls the operations of the inverter 31 based on manipulation of a changeover switch 34 (one example of the electric components A) that is provided in the boarding/driving section 3 for switching between forward and reverse travel directions, and based on output from a pedal sensor 36 (one example of the electric components A) that detects a depression amount of an accelerator pedal 35 provided in the boarding/driving section 3. Based on a control operation of the drive control unit 25C, the inverter 31 rotates the electric motor 8 in a rotation direction depending on the manipulated state of the changeover switch 34. Furthermore, based on a control operation of the drive control unit 25C, the inverter 31 outputs drive control current (e.g. a PWM signal (pulse-width modulation signal) corresponding to the depression amount of the accelerator pedal 35 to the electric motor 8.

In this way, in the electric two-wheel drive mode, the driver can switch between forward and reverse travel directions by manipulating the changeover switch 34, and adjust the vehicle speed by depressing the accelerator pedal 35

In the engine two-wheel drive mode, the drive control unit 25C overrides manipulation of the changeover switch 34, and transmits output from the pedal sensor 36 to the E-ECU. Based on output from the pedal sensor 36, the E-ECU controls the number of revolutions of the engine 9 to be outputted. The operational state of the transmission mechanism changes in accordance with the manipulated position of the change speed lever 20.

In this way, in the engine two-wheel drive mode, the driver can switch between forward and reverse travel directions and switch between two speeds (high and low) of the forward travel power by manipulating the change speed lever 20, and also adjust the vehicle speed by depressing the accelerator pedal 35.

In the hybrid four-wheel drive mode, the drive control unit 25C overrides manipulation of the changeover switch 34, and transmits output from the pedal sensor 36 to the E-ECU. The drive control unit 25C also controls the operations of the inverter 31 based on output from a change speed sensor 37 (one example of the electric components A) that detects the manipulated position of the change speed lever 20, and based on output from a revolution sensor 38 (one example of the electric components A) that detects the number of revolutions of the transmission mechanism being outputted. Based on a control operation of the drive control unit 25C, the inverter 31 rotates the electric motor 8 in a rotation direction corresponding to the manipulated position of the change speed lever 20. Furthermore, based on a control operation of the drive control unit 25C, the inverter 31 outputs, to the electric motor 8, drive control current (e.g. a PWM signal) corresponding to the number of revolutions of the transmission mechanism being outputted.

In this way, in the hybrid four-wheel drive mode, the driver can switch between forward and reverse travel directions and switch between two speeds (high and low) of rear-wheel forward travel power, and also adjust the vehicle speed by depressing the accelerator pedal 35 while maintaining consistency between the circumferential speed of the front wheels 4 and the circumferential speed of the rear wheels 5.

A rotary potentiometer can be used as the pedal sensor 36, for example. A rotary potentiometer or a multi-contact switch can be used as the change speed sensor 37, for example. The revolution sensor 38 can be of an electromagnetic pickup type, for example.

Figure 5:
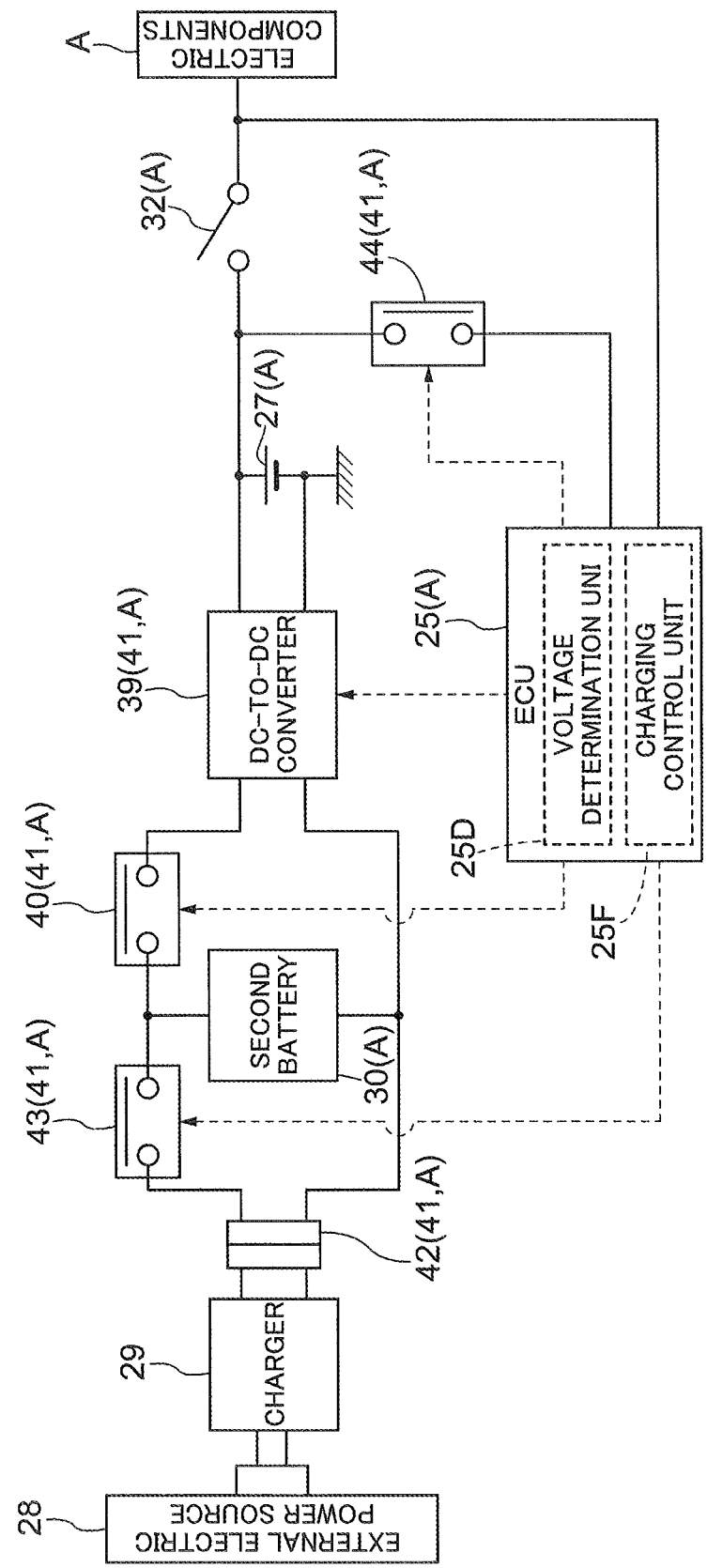

As shown in FIGS. 4 and 5, this multipurpose work vehicle includes a DC-to-DC converter (direct current to direct current converter) 39 (one example of the electric components A) that converts the output voltage of the second battery 30 into a voltage corresponding to the first battery 27. The ECU 25 includes a voltage determination unit 25D that determines whether the output voltage of the first battery 27 exceeds a reference voltage value necessary for starting the engine 9, and an electric power supply control unit 25E that controls the supply of electric power from the second battery 30 to 12-volt electric components A. Between the second battery 30 and the DC-to-DC converter 39, there is interposed a normally-open first relay switch 40 (one example of the electric components A) that permits/interrupts application of current from the second battery 30 to the DC-to-DC converter 39. When the voltage determination unit 25D determines that the output voltage of the first battery 27 exceeds the reference voltage value, the electric power supply control unit 25E performs electric power supply suspension control to suspend the supply of electric power from the second battery 30 to 12-volt electric components A via the DC-to-DC converter 39. When the voltage determination unit 25D determines that the output voltage of the first battery 27 is equal to or lower than the reference voltage value, the electric power supply control unit 25E performs electric power supply control to supply electric power from the second battery 30 to 12-volt electric components A via the DC-to-DC converter 39.

In the electric power supply control, the electric power supply control unit 25E places a relay coil (not shown) of the first relay switch 40 into an excited state by applying current to the relay coil. This places the first relay switch 40 into a closed state in which current can be applied therethrough. Furthermore, the electric power supply control unit 25E converts the output voltage of the second battery 30 into a voltage corresponding to 12-volt electric components A by bringing the DC-to-DC converter 39 into operation.

In the electric power supply suspension control, the electric power supply control unit 25E places the relay coil (not shown) of the first relay switch 40 into a non-excited state by suspending the application of current to the relay coil. This places the first relay switch 40 into an open state in which current cannot be applied therethrough. Furthermore, the electric power supply control unit 25E suspends the operations of the DC-to-DC converter 39.

In this way, even if the first battery 27 keeps discharging without getting charged from the electric generator 26 under long hours of traveling of the vehicle body in the electric two-wheel drive mode, for example, the possibility of failure to start the engine 9 due to the first battery 27 producing an output voltage lower than the reference voltage value can be prevented.

As shown in FIGS. 4 and 5, this multipurpose work vehicle includes a plug-in charging system 41 that enables the batteries 27, 30 to be charged from the external electric power source 28. The charging system 41 includes the DC-to-DC converter 39 and first relay switch 40 that are described above, as well as a connector 42 for external charging (one example of the electric components A) connected to the external electric power source 28 via the charger 29, a normally-open second relay switch 43 (one example of the electric components A) that permits/interrupts application of current from the connector 42 to the second battery 30, and a charging switch 44 that instructs the ECU 25 to start charging from the external electric power source 28. During charging from the external electric power source 28, the DC-to-DC converter 39 can convert the output voltage of the charger 29 into a voltage corresponding to the first battery 27, and output the resultant voltage to the first battery 27.

Although not shown, the charger 29 includes an AC-to-DC converter (alternating current to direct current converter), a DC-to-DC converter, an information management unit that obtains and manages information related to charging, etc. Accordingly, the charger 29 converts alternating-current electric power from the external electric power source 28 into direct-current electric power, converts the direct-current electric power into a voltage corresponding to the specification of the second battery 30, and supplies the resultant voltage to the charging system 41. The information management unit can communicate with the ECU 25. The charging switch 44 issues an instruction to start charging from the external electric power source 28 by applying current from the first battery 27 to the ECU 25. The charging switch 44 is a manually operable momentary switch that returns to a blocking state for blocking the application of current from the first battery 27 to the ECU 25. The charging switch 44 includes a self-holding circuit 44A that can hold a connecting state in which current can be applied from the first battery 27 to the ECU 25.

As shown in FIGS. 4 and 5, the ECU 25 includes a charging control unit 25F that controls charging of the first battery 27 and the second battery 30 from the external electric power source 28.

During charging from the external electric power source 28, if the voltage determination unit 25D determines that the output voltage of the first battery 27 exceeds the aforementioned reference voltage value, the charging control unit 25F performs a first charging control to charge the second battery 30 from the external electric power source 28.

During charging from the external electric power source 28, if the voltage determination unit 25D determines that the output voltage of the first battery 27 is equal to or lower than the reference voltage value, the charging control unit 25F performs a second charging control to charge the first battery 27 from the external electric power source 28 via the DC-to-DC converter 39 in preference to the first charging control.

That is, when an instruction to start charging from the external electric power source 28 has been issued by manipulation of the charging switch 44, if the result of the determination by the voltage determination unit 25D shows that the output voltage of the first battery 27 exceeds the reference voltage value, the charging control unit 25F charges the second battery 30 from the external electric power source 28 by performing the first charging control. If the output voltage of the first battery 27 is equal to or lower than the reference voltage value, the charging control unit 25F charges the first battery 27 from the external electric power source 28 by performing the second charging control.

In this way, during charging from the external electric power source 28, the second battery 30 can be charged while preventing the first battery 27 from producing an output voltage lower than the reference voltage value, even if the output voltage of the first battery 27 was equal to or lower than the reference voltage value since before the start of charging from the external electric power source 28, and even if the output voltage of the first battery 27 decreased to the reference voltage value during charging from the external electric power source 28.

As a result, after the second battery 30 is charged from the external electric power source 28, the possibility of failure to start the engine 9 due to the first battery 27 producing an output voltage lower than the reference voltage value can be prevented.

In the second charging control, the DC-to-DC converter 39 converts the output voltage of the charger 29 into a voltage corresponding to the first battery 27, and outputs the resultant voltage to the first battery 27.

As shown in FIGS. 4 and 5, the charging switch 44 interrupts only the application of current from the first battery 27 to the ECU 25. The discriminating unit 25A of the ECU 25 functions as a permission/interruption discriminating unit that determines a connecting/blocking state of the key switch (main switch) 32.

If the discriminating unit 25A determines that the key switch 32 is at the "OFF" position (blocking state), the charging control unit 25F holds the charging switch 44 in the connecting state by applying current to the self-holding circuit 44A of the charging switch 44, and performs the first charging control or the second charging control. If the discriminating unit 25A determines that the key switch 32 is at the "ON" position (connecting state) or "START" position (connecting state), the charging control unit 25F does not apply current to the self-holding circuit 44A, whereby the charging control unit 25F does not hold the charging switch 44 in the connecting state, and performs neither the first charging control nor the second charging control.

That is, when the key switch 32 is at the "ON" position (connecting state) or "START" position (connecting state), as current is applied to the electric components A, the electric motor 8 is in a drivable state, the engine 9 is in an operating state, or the engine 9 is in a startable state, meaning that the vehicle body is in or can be shifted to a state in which the vehicle body can travel. Therefore, even if the charging switch 44 is manipulated to place it into the connecting state, the charging control unit 25F does not apply current to the self-holding circuit 44A, and allows the charging switch 44 to return to the blocking state. Consequently, the charging switch 44 returns to the blocking state, thereby blocking the application of current from the first battery 27 to the ECU 25 via the charging switch 44. Furthermore, the charging control unit 25F performs neither the first charging control nor the second charging control, thereby preventing charging of the first battery 27 and second battery 30 from the external electric power source 28.

On the other hand, when the key switch 32 is at the "OFF" position (blocking state), as current is not applied to the electric components A, the electric motor 8 is in a non-drivable state and the engine 9 is in a non-startable state, meaning that the vehicle body cannot travel. Therefore, if the charging switch 44 is manipulated to place it into the connecting state, the charging control unit 25F holds the charging switch 44 in the connecting state by applying current to the self-holding circuit 44A, thereby maintaining the application of current from the first battery 27 to the ECU 25 via the charging switch 44. Furthermore, the charging control unit 25F charges the first battery 27 or the second battery 30 from the external electric power source 28 by performing the first charging control or second charging control.

As a result, the possibility that the driver runs the vehicle body by mistake during charging of the first battery 27 or the second battery 30 from the external electric power source 28 can be prevented.

Figure 6:
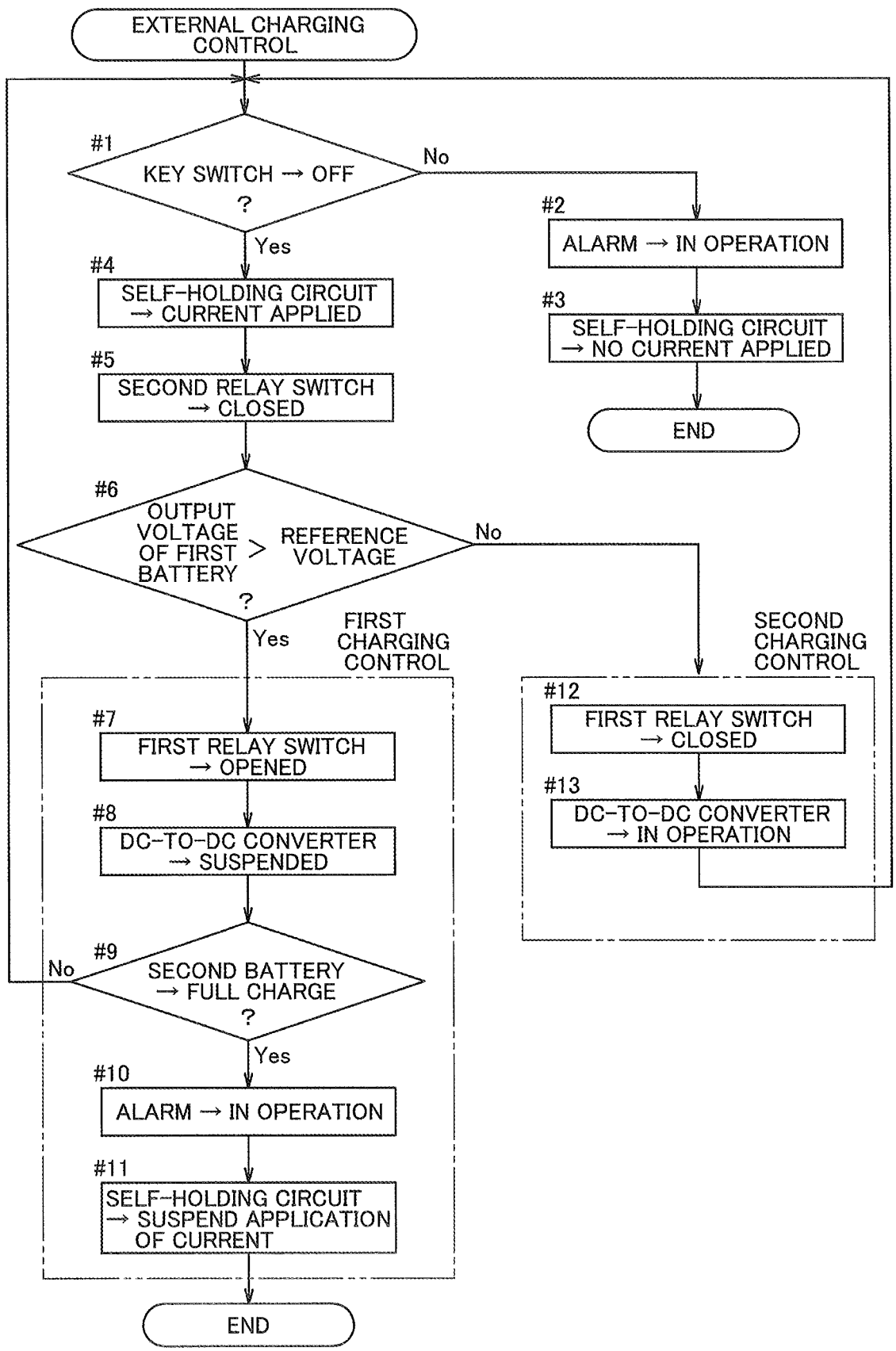

Based on the flowchart of FIG. 6, the following describes control operations of the ECU 25 in external charging control to perform charging from the external electric power source 28.

The external charging control is performed when an instruction to start charging from the external electric power source 28 is issued by manipulation of the charging switch 44.

In the external charging control, first, the discriminating unit 25A determines the manipulated position of the key switch 32 (step #1).

If the key switch 32 is at the "ON" position (connecting state) or "START" position (connecting state), the charging control unit 25F brings an alarm (not shown), such as an on-board buzzer, into operation for a predetermined period to give notice of the "ON" position or "START" position of the key switch 32 (step #2). The charging control unit 25F also causes the charging switch 44 to return to the blocking state by blocking the application of current to the self-holding circuit 44A of the charging switch 44, and ends the external charging control (step #3).

If the key switch 32 is at the "OFF" position (blocking state), the charging control unit 25F holds the charging switch 44 in the connecting state by applying current to the self-holding circuit 44A (step #4). The charging control unit 25F also places a relay coil (not shown) of the second relay switch 43 into an excited state by applying current to the relay coil, thereby placing the second relay switch 43 into a closed state in which current can be applied thereto, and starts charging from the external electric power source 28 (step #5).

After charging from the external electric power source 28 is started, the voltage determination unit 25D determines whether the output voltage of the first battery 27 exceeds the aforementioned reference voltage value (step #6).

If the output voltage of the first battery 27 exceeds the reference voltage value, the charging control unit 25F performs the first charging control to charge the second battery 30 from the external electric power source 28 (steps #7 to #11).

If the output voltage of the first battery 27 is equal to or lower than the reference voltage value, the charging control unit 25F performs the second charging control in preference to the first charging control (steps #12 and #13).

In the first charging control, the charging control unit 25F maintains the relay coil of the first relay switch 40 in a non-excited state by blocking the application of current to the relay coil, thereby maintaining the first relay switch 40 in an open state (step #7). The charging control unit 25F also maintains the DC-to-DC converter 39 in a suspended state (step #8).

Thereafter, based on information from the information management unit of the charger 29 and information from the management system of the second battery 30, the charging control unit 25F determines whether a charge state of the second battery 30 is a fully charged state (step #9).

If the second battery 30 is not in a fully charged state, the external charging control returns to step #1.

If the second battery 30 is in a fully charged state, the charging control unit 25F brings an alarm (not shown), such as an on-board buzzer, into operation for a predetermined period to give notice of completion of charging of the second battery 30 (step #10), thereafter causes the charging switch 44 to return to the blocking state by suspending the application of current to the self-holding circuit 44A, and ends the external charging control (step #11).

In the second charging control, the charging control unit 25F places the relay coil of the first relay switch 40 into an excited state by applying current to the relay coil, thereby placing the first relay switch 40 into a closed state, and holds the first relay switch 40 in the closed state (step #12). The charging control unit 25F also brings the DC-to-DC converter 39 into operation to convert the output voltage of the charger 29 into a voltage corresponding to the first battery 27 (step #13). Thereafter, the external charging control returns to step #1.

Figure 7:
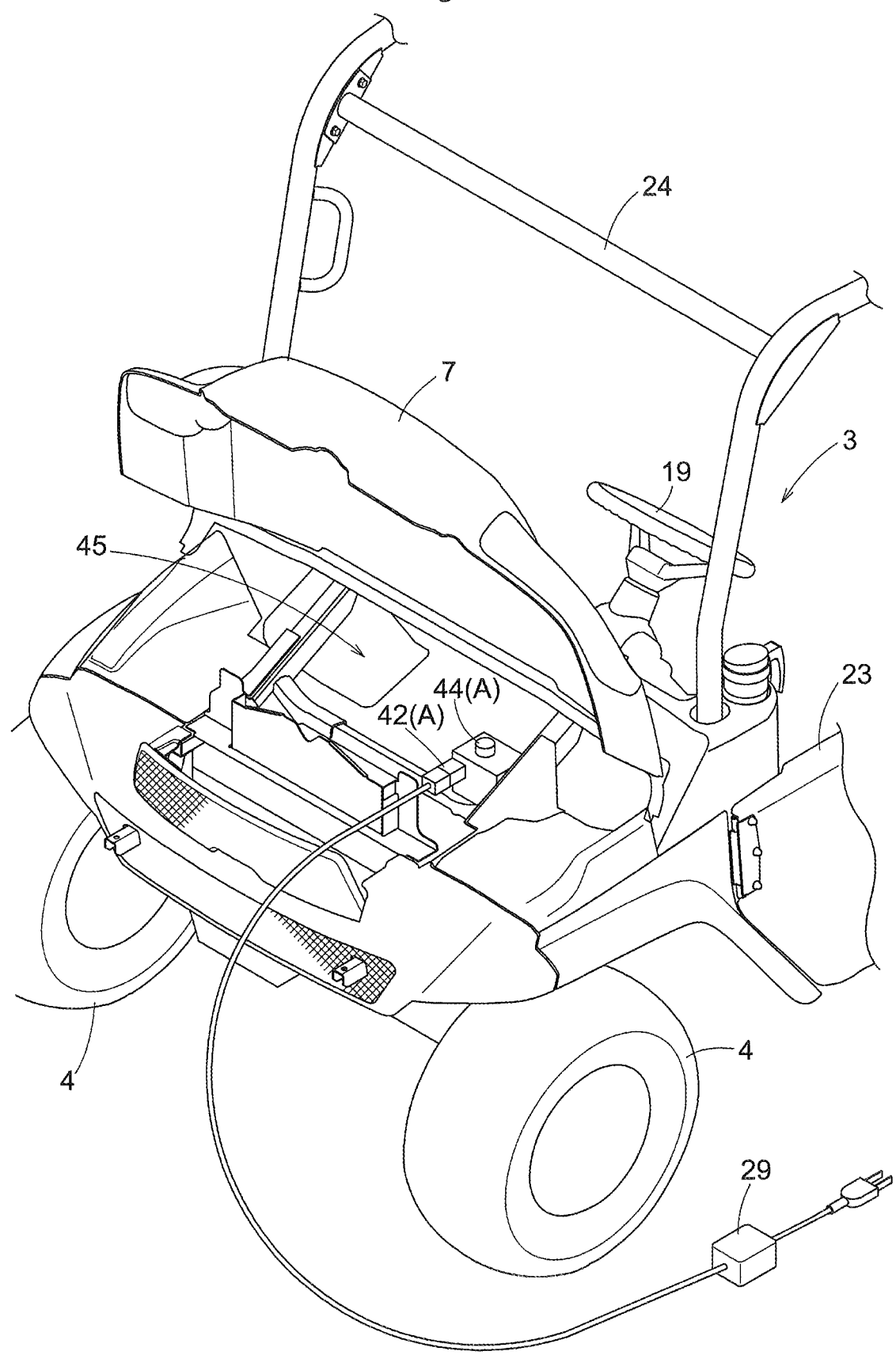

As shown in FIG. 7, the connector 42 and charging switch 44 are disposed in a storage compartment 45 that is opened and closed via the hood 7.

Therefore, charging from the external electric power source 28 is always performed while the hood 7 is open. Naturally, when the driver attempts to drive the multipurpose work vehicle, the hood 7 is open if the vehicle body is currently being charged from the external electric power source 28. This makes it easy for the driver to acknowledge whether the vehicle body is currently being charged from the external electric power source 28.

As a result, the possibility that the driver runs the vehicle body by mistake during charging of the first battery 27 or second battery 30 from the external electric power source 28 can be prevented more reliably.

The connector 42 and the charging switch 44 are located adjacent a swing pivot of the hood 7 in the storage compartment 45.

Therefore, during charging from the external electric power source 28, the open hood 7 can function as a rain cover for the connector 42 and charging switch 44.

As a result, the connector 42 and charging switch 44 can be prevented from getting wet from the rain during charging from the external electric power source 28 with the hood 7 open, without providing dedicated rain cover equipment.

The hood 7 has the swing pivot in its rear end portion. Accordingly, the connector 42 and charging switch 44 are located at a rear end portion of the storage compartment 45.

[Variations of First Embodiment]

The present invention is not limited to the configurations exemplarily described in the foregoing embodiment. Below, typical variations of the foregoing embodiment of the present invention will be exemplarily described.

(1) The plug-in hybrid work vehicle may include left and right in-wheel motors as the electric motor 8 for traveling.

(2) The engine 9 may be a diesel engine including a common rail system.

(3) The electronic control unit 25 may include at least one of a first battery monitor unit that monitors the voltage, current, temperature, and the like of the first battery 27, and a second battery monitor unit that monitors the voltage, current, temperature, and the like of the second battery 30.

(4) The electronic control unit for engine control, for example, may be integrated with the electronic control unit 25.

(5) The charger 29 may be fixedly mounted on the vehicle body.

(6) A NiMH battery (nickel-metal hydride battery) may be used as the second battery 30, for example.

(7) The main switch may be a key switch 32 that can be manipulated to be shifted to a position for external charging in a direction opposite to a manipulation direction from the "OFF" position to the "ON" position and "START" position.

In this case, during charging from the external electric power source 28 while the main switch, doubling as the charging switch 44, is at the position for external charging (blocking state), the driver cannot manipulate the main switch to the "ON" position (connecting state) or the "START" position (connecting state). Therefore, the possibility that the driver runs the vehicle body by mistake during charging of the first battery 27 or second battery 30 from the external electric power source 28 can be prevented reliably.

(8) The connector 42 and the charging switch 44 for external charging may be disposed in a storage compartment that is opened and closed as the driver's seat 21 or passenger's seat 22 is swingably displaced.

In this case, charging from the external electric power source 28 is always performed in a state in which the driver's seat 21 or passenger's seat 22 has been swingably displaced to disable seating. Naturally, when the driver attempts to drive the vehicle body, the driver's seat 21 or passenger's seat 22 is in a state in which it has been swingably displaced to disable seating if the vehicle body is currently being charged from the external electric power source 28. This makes it easy for the driver to acknowledge whether the vehicle body is currently being charged from the external electric power source 28.

As a result, the possibility that the driver runs the vehicle body by mistake during charging of the first battery 27 or the second battery 30 from the external electric power source 28 can be prevented more reliably.

(9) Utility of the present invention is not limited to a plug-in hybrid multipurpose work vehicle as described in the foregoing embodiment. In furtherance thereto, the present invention is applicable to a plug-in hybrid work vehicle (e.g. a multipurpose work vehicle, tractor, and mower) including an electronic control unit that controls on-board electric components, a first battery that is charged using electric power from an on-board electric generator, and a second battery that is charged from an external power source via a charger.

Second Embodiment

A second embodiment will be described hereinafter with reference to FIGS. 8-23. In the second embodiment, a parallel hybrid multipurpose work vehicle is illustrated as an example of a work vehicle.

Figure 8:
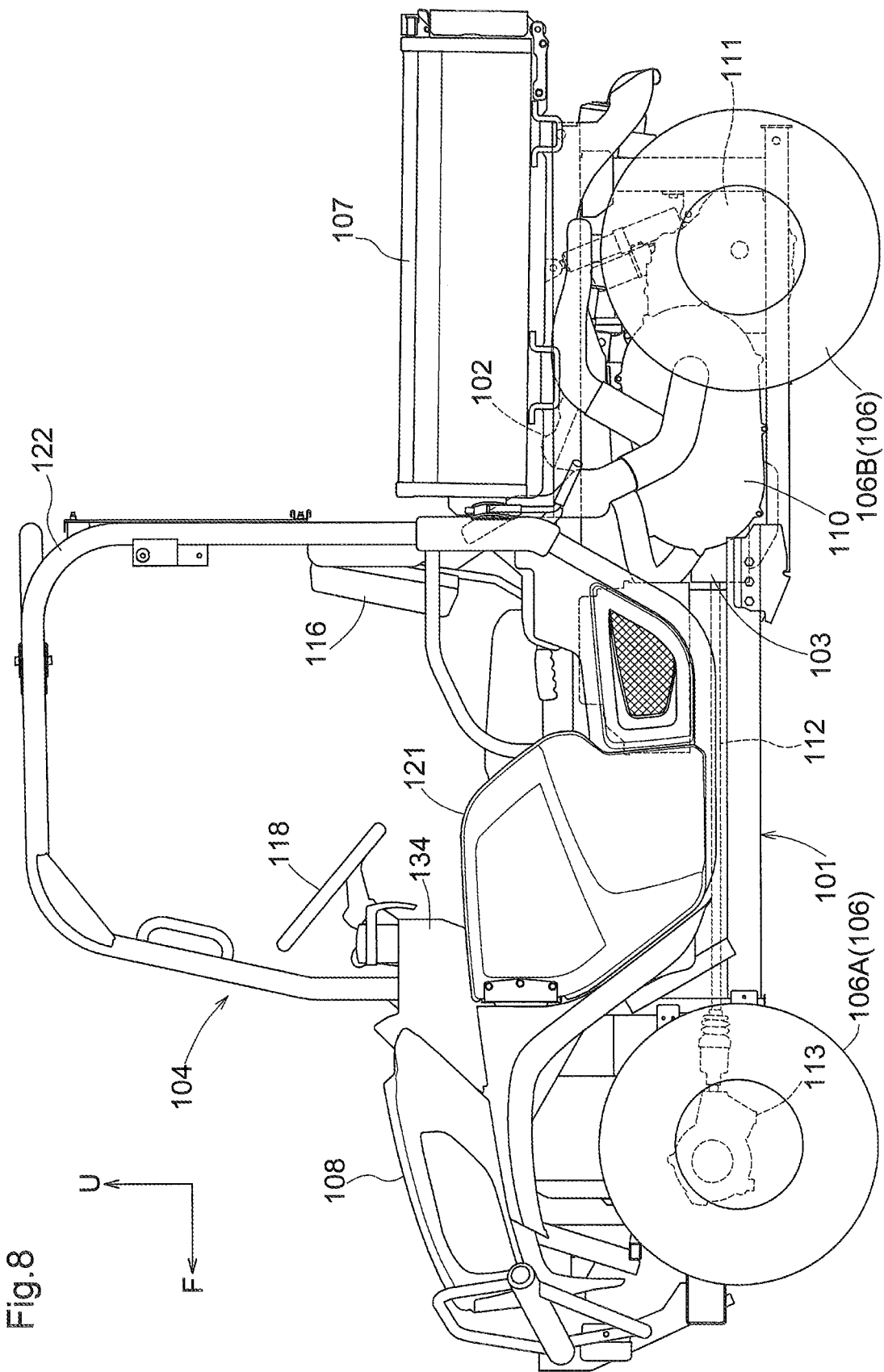
Figure 9:
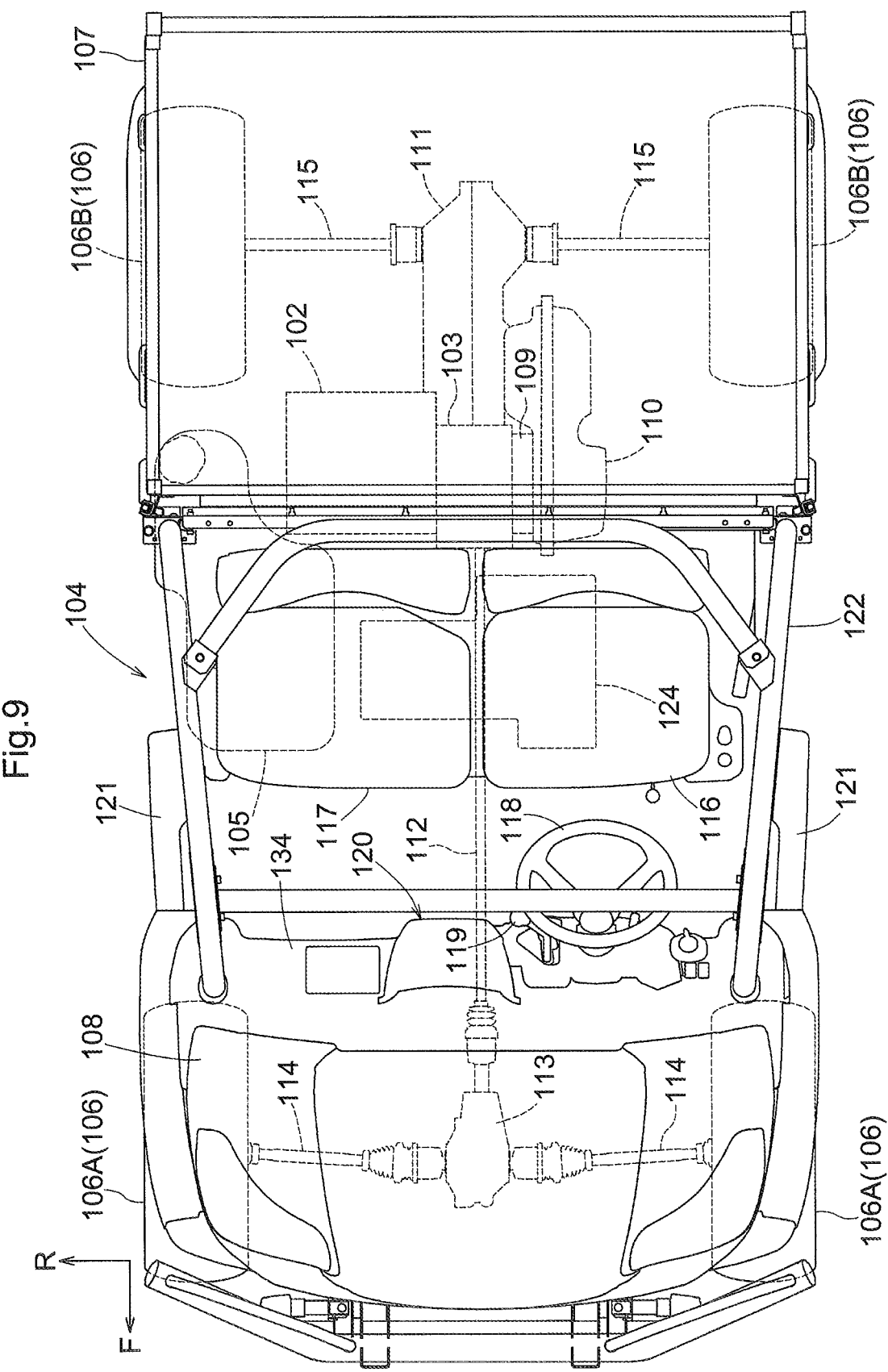

In the following description, as shown in FIG. 8, the direction of arrow "F" points the front side of the multipurpose work vehicle, whereas the direction of arrow "U" points the upper side of the multipurpose work vehicle. As shown in FIG. 9, the direction of arrow "F" points the front side of the multipurpose work vehicle, whereas the direction of arrow "R" points the right side of the multipurpose work vehicle.

As shown in FIGS. 8 and 9, the multipurpose work vehicle exemplarily described in the present embodiment includes: a vehicle body frame 101 that constitutes a frame of a vehicle body; a gasoline engine (referred to as "engine" hereinafter) 102 and motor generator 103 that are disposed as power sources at a central portion of the vehicle body in the front-rear direction; a two-passenger boarding/driving section 104 located at the central portion of the vehicle body in the front-rear direction; a fuel tank 105 located at the right side of the vehicle body; a wheel-type travel device 106 provided with left and right front wheels 106A and left and right rear wheels 106B; a load bed 107 that is joined to a rear portion of the vehicle body in a vertically swingable manner; and a swingably openable and closable hood 108. The engine 102 and motor generator 103 are interlocked via, for example, an electromagnetic clutch (not shown) in such a manner that interlocking therebetween can be permitted and interrupted.

Power from the power sources is transmitted to a gear-type transmission device 111 via a centrifugal clutch 109 and a belt-type continuously variable transmission device 110. Power extracted from the gear-type transmission device 111 for front-wheel drive is transmitted to the left and right front wheels 106A via a first drive shaft 112, a front-wheel differential device 113, left and right second drive shafts 114, etc. Power extracted from the gear-type transmission device 111 for rear-wheel drive is transmitted to the left and right rear wheels 106B via left and right third drive shafts 115, etc.

Although not shown, a casing of the gear-type transmission device 111 houses a transmission mechanism, a rear-wheel differential mechanism, left and right brakes, etc. The transmission mechanism switches power from the power sources between forward travel power and reverse travel power, and further switches between two speeds (high and low) of the forward travel power.

Figure 10:
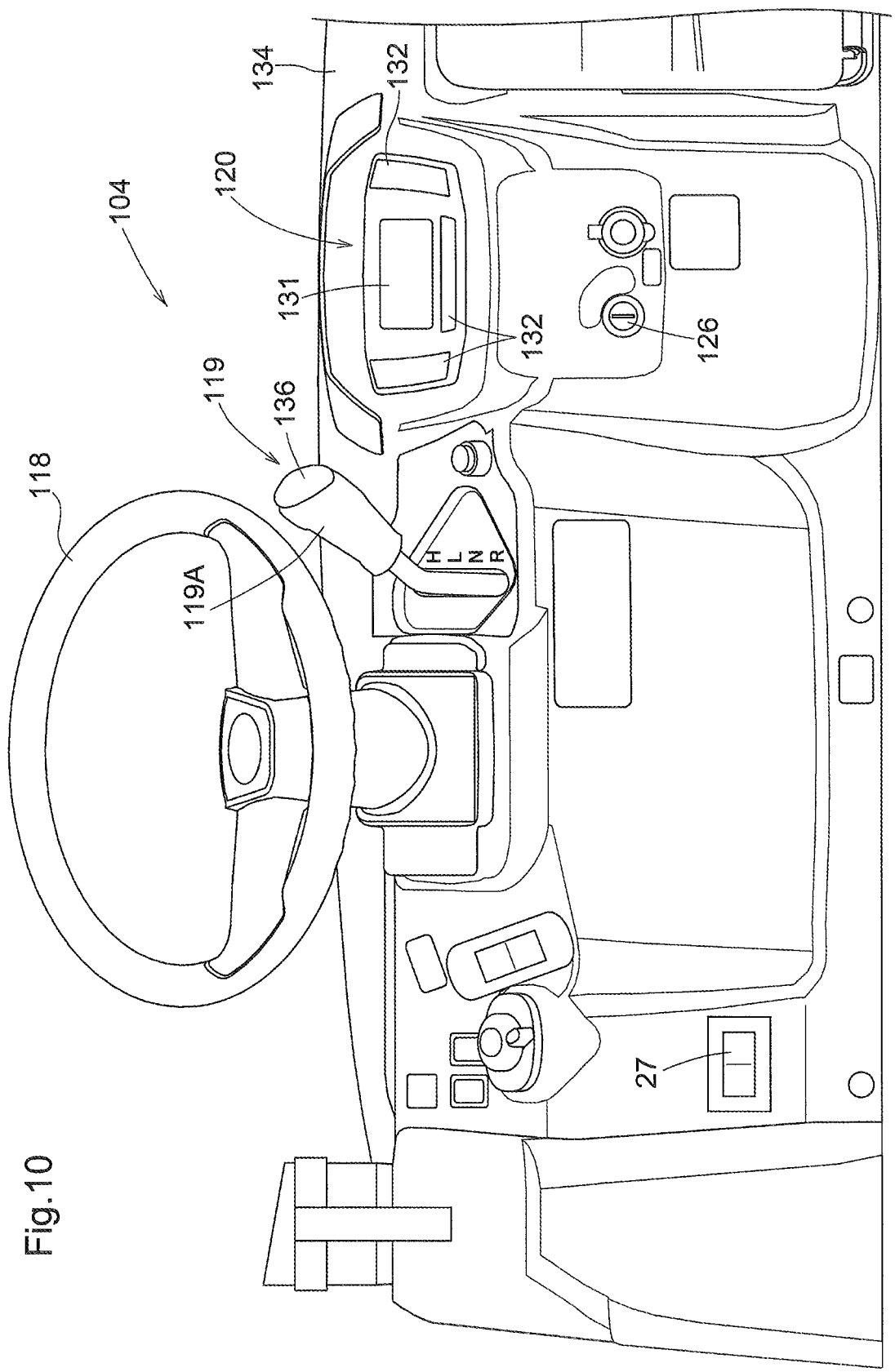

As shown in FIGS. 8 to 10, the boarding/driving section 104 includes a driver's seat 116 on the left side, a passenger's seat 117 on the right side, a steering wheel 118 for front-wheel steering located in front of the driver's seat 116, a change speed lever 119 that is located adjacent to the right side of the steering wheel 118 and swingable in the front-rear direction, a display device 120 that displays various types of information, left and right doors 121, a protection frame 122, etc. The change speed lever 119 can be switched among and held at a neutral position N, a low-speed forward travel position L that is closer to the front side of the vehicle body than the neutral position N is, a high-speed forward travel position H that is closer to the front side of the vehicle body than the low-speed forward travel position L is, and a reverse travel position R that is closer to the rear side of the vehicle body than the neutral position N is. The change speed lever 119 is operatively linked to the transmission mechanism via e.g. control cables (not shown).

Figure 11:
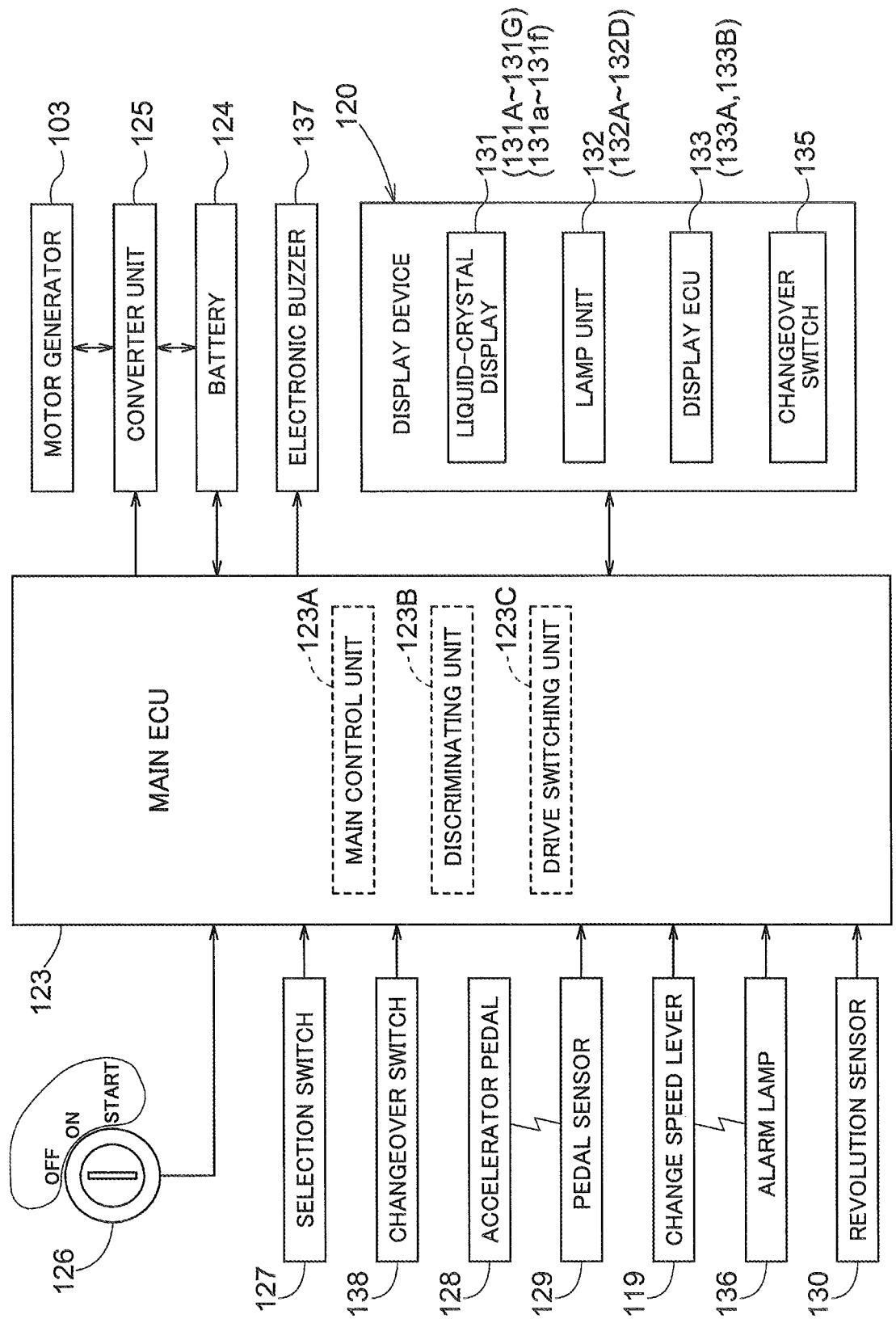

As shown in FIGS. 8, 9 and 11, this multipurpose work vehicle includes an on-board main electronic control unit (referred to as "main ECU" hereinafter) 123, and a battery 124 that is charged using electric power from the motor generator 103.

The main ECU 123 comprises a microcomputer including a CPU (central processing unit), an EEPROM (electrically erasable programmable read-only memory), etc. The main ECU 123 is connected to on-board electric components such as the motor generator 103 and the display device 120, such that communication or electric power transmission can be performed therebetween via e.g. in-vehicle communication such as a controller area network (CAN) and/or an electric power line. The battery 124 is a lithium-ion battery that is connected to the electric components such as the motor generator 103 and main ECU 123, via a converter unit 125 and the like. The battery 124 includes a management system that monitors the voltage, current, temperature and the like of the battery 124. For example, upon detecting an abnormality, the management system protects the battery 124 by restricting or suspending charging and discharging. The motor generator 103 compensates for inefficient output from the engine 102 by functioning as a travel motor using electric power supplied from the battery 124 when e.g. performing high-load work and putting the vehicle body in motion. The motor generator 103 also supplies electric power obtained from engine power to the battery 124 by functioning as an electric generator with use of power from the engine 102. The converter unit 125 includes an inverter, an AC-to-DC converter, a DC-to-DC converter, etc.

As shown in FIGS. 10 and 11, this multipurpose work vehicle includes a key switch 126 that permits/interrupts application of current to the electric components, including the main ECU 123. The key switch 126 can be shifted to an "OFF" position, "ON" position and "START" position, and can be held at the "OFF" position and "ON" position. Upon shifting to the "START" position, the key switch 126 is urged to return to the "ON" position. When manipulated to the "OFF" position, the key switch 126 enters a blocking state for blocking the application of current from the battery 124 to the electric components. When manipulated to the "ON" position, the key switch 126 enters a connecting state for applying current from the battery 124 to the electric components. When manipulated to the "START" position, the key switch 126 instructs the main ECU 123 to start the engine 102 while maintaining the connecting state.

Although not shown, the main ECU 123 transmits the engine start instruction from the key switch 126 to an electronic control unit for the engine (referred to as "engine ECU" hereinafter). Based on the engine start instruction, the engine ECU starts the engine 102 by bringing a starter motor and the like into operation. The engine ECU is composed of a microcomputer including a CPU, EEPROM, etc.

As shown in FIGS. 10 and 11, the main ECU 123 includes: a main control unit 123A that controls the operations of the motor generator 103, the electromagnetic clutch and the like; a discriminating unit 123B that determines the manipulated position of the key switch 126; and a drive switching unit 123C that switches between different types of travel drive modes. The main ECU 123 has following types of travel drive modes: an electric mode for driving the travel device 6 using power from the motor generator 103 alone, an engine drive mode for driving the travel device 106 using power from the engine 102 alone, and a hybrid drive mode for driving the travel device 106 using the combination of power from the motor generator 103 and power from the engine 102.

Upon detecting shifting of the key switch 126 from the "OFF" position to the "ON" position based on information from the discriminating unit 123B, the drive switching unit 123C switches the travel drive mode to the electric mode.

Upon detecting shifting of the key switch 126 from the "ON" position to the "START" position based on information from the discriminating unit 123B, the drive switching unit 123C switches to a drive mode selected by manipulation of a selection switch 127 that is provided in the boarding/driving section 104 for drive mode selection. The selection switch 127 can switch between a first state for selecting the engine drive mode, and a second state for selecting the hybrid drive mode. When the selection switch 127 is in the first state, the drive switching unit 123C switches the travel drive mode to the engine drive mode. When the selection switch 127 is in the second state, the drive switching unit 123C switches the travel drive mode to the hybrid drive mode.

In this way, a driver can select the electric mode as the travel drive mode by manipulating the key switch 126 from the "OFF" position to the "ON" position, thereby enabling the vehicle body to travel without bringing the engine 102 into operation. On the other hand, when the engine 2 is in operation as a result of manipulating the key switch 126 from the "ON" position to the "START" position, the driver can switch the travel drive mode between the engine drive mode and the hybrid drive mode by manipulating the selection switch 127.

In the electric mode, the main control unit 123A blocks interlocking between the engine 102 and the motor generator 103 by placing the electromagnetic clutch into a blocking state, and uses the motor generator 103 as the travel motor.

Then, the main control unit 123A controls the operations of the inverter of the converter unit 125 based on output from a pedal sensor 129 that detects a depression amount of an accelerator pedal 128 provided in the boarding/driving section 104. Based on a control operation of the main control unit 123A, the inverter outputs drive control current (e.g. a PWM signal) corresponding to the depression amount of the accelerator pedal 128 to the motor generator 103. The operational state of the transmission mechanism changes in accordance with the manipulated position of the change speed lever 119.

In the engine drive mode, the main control unit 123A places the electromagnetic clutch into a connecting state, and uses the motor generator 103 as the electric generator that generates electric power using power from the engine 102. The main control unit 123A transmits output from the pedal sensor 129 to the engine ECU. The engine ECU controls the number of revolutions of the engine 102 to be outputted based on output from the pedal sensor 129, output from a revolution sensor 130 that detects the number of revolutions of the engine 102 being outputted, etc. The operational state of the transmission mechanism changes in accordance with the manipulated position of the change speed lever 119.

In the hybrid drive mode, the main control unit 123A transmits output from the pedal sensor 129 to the engine ECU, and controls the operations of e.g. the electromagnetic clutch and the inverter of the converter unit 125 based on output from the pedal sensor 129, a control program for hybrid, etc. The engine ECU controls the number of revolutions of the engine 102 to be outputted based on output from the pedal sensor 129, output from the revolution sensor 130, etc. The inverter outputs drive control current (e.g. a PWM signal) corresponding to e.g. a required assist force to the motor generator 103, based on output from the pedal sensor 129, the control program for hybrid, etc. The operational state of the transmission mechanism changes in accordance with the manipulated position of the change speed lever 119.

That is, regardless of switching of the travel drive mode, the driver can switch between forward and reverse travel directions and switch between two speeds (high and low) of the forward travel power by manipulating the change speed lever 119, and also adjust the vehicle speed by depressing the accelerator pedal 128.

A rotary potentiometer can be used as the pedal sensor 129, for example. The revolution sensor 130 can be of an electromagnetic pickup type, for example.

Figure 12:
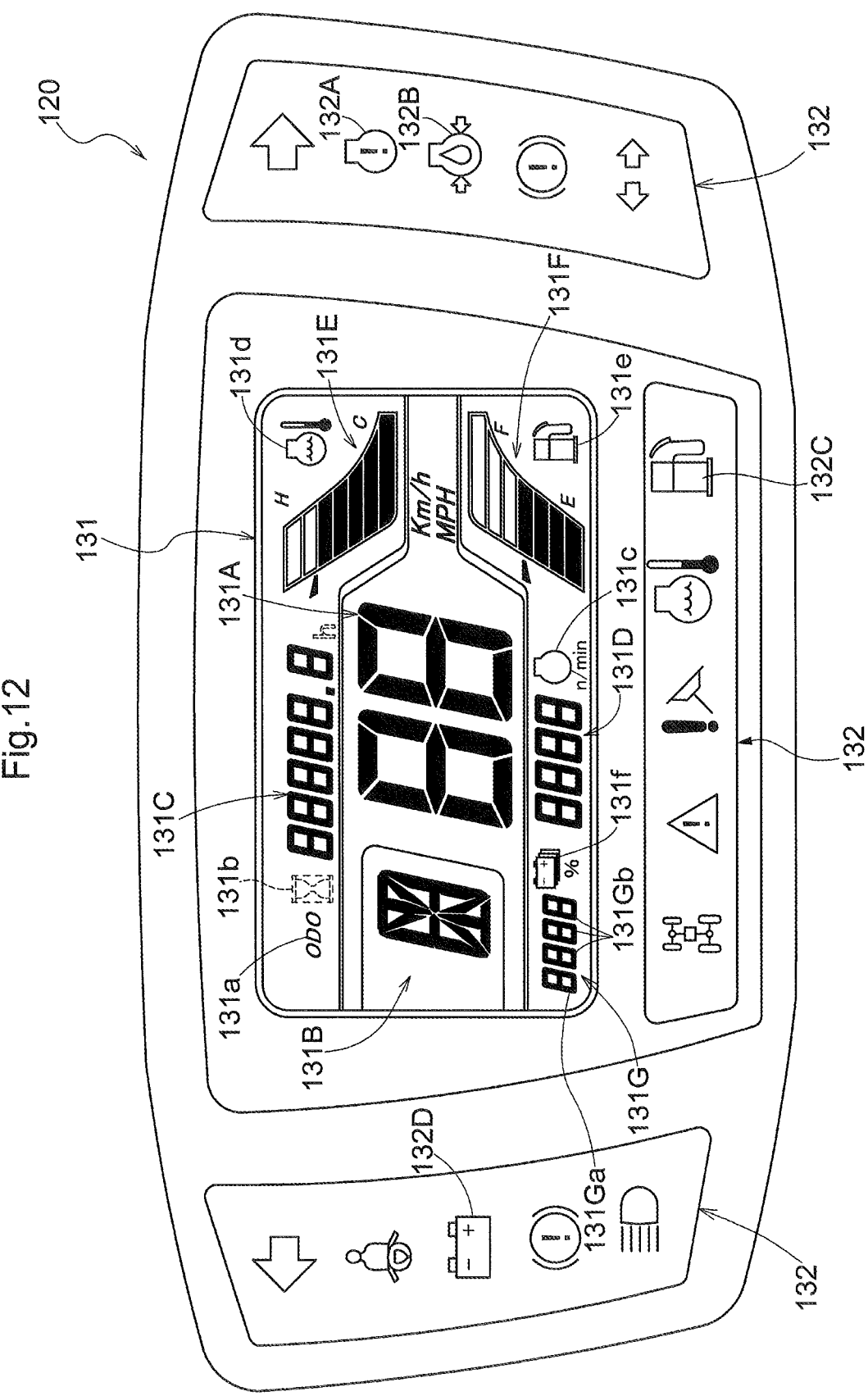

As shown in FIGS. 10 to 12, the display device 120 includes: a liquid crystal display 131 provided with a plurality of display units that display information related to the engine 102 in a segmented format; a lamp unit 132 that has various types of LED (light emitting diode) warning lamps and the like; and a display electronic control unit (referred to as "display ECU" hereinafter) 133 that controls the operations of the liquid crystal display 131 and lamp unit 132.

That is, as the display device 120 includes the liquid crystal display 131 of a segmented format, it can be reduced in cost compared with a case in which it includes a dot-matrix liquid crystal display.

As shown in FIG. 12, the liquid crystal display 131 includes a plurality of display units such as: a vehicle speed display unit 131A that displays a vehicle speed, a speed position display unit 131B that displays the manipulated position of the change speed lever 119, a cumulative display unit 131C that displays a cumulative distance traveled or a cumulative period of engine operation, a revolution display unit 131D that displays the number of engine revolutions, a temperature display unit 131E that displays a temperature of an engine coolant, and a remaining amount display unit 131F that displays a remaining amount of fuel.

The vehicle speed display unit 131A has two 7-segment display sections each corresponding to one digit, and is located at the center of the liquid crystal display 131. The speed position display unit 131B has a 14-segment display section corresponding to one digit, and is located to the left of the vehicle speed display unit 131A on the liquid crystal display 131. The cumulative display unit 131C has six 7-segment display sections each corresponding to one digit, and is located above the vehicle speed display unit 131A on the liquid crystal display 131. The revolution display unit 131D has four 7-segment display sections each corresponding to one digit, and is located below the vehicle speed display unit 131A on the liquid crystal display 131. The temperature display unit 131E has a 7-segment display section that displays a bar graph, and is located to the right of the vehicle speed display unit 131A and cumulative display unit 131C on the liquid crystal display 131. The remaining amount display unit 131F has a 7-segment display section that displays a bar graph, and is located to the right of the vehicle speed display unit 131A and revolution display unit 131D on the liquid crystal display 131.

The liquid crystal display 131 includes a plurality of symbols such as: an distance symbol 131a indicating a cumulative distance traveled, a period symbol 131b indicating a cumulative period of engine operation, a revolution symbol 131c indicating the number of engine revolutions, a coolant temperature symbol 131d indicating a temperature of the engine coolant, and a refueling symbol 131e indicating refueling.

The distance symbol 131a and period symbol 131b are located adjacent to the left side of the cumulative display unit 131C on the liquid crystal display 131. The revolution symbol 131c is located adjacent to the right side of the revolution display unit 131D on the liquid crystal display 131. The coolant temperature symbol 131d is located adjacent to the right side of the temperature display unit 131E on the liquid crystal display 131. The refueling symbol 131e is located adjacent to the right side of the remaining amount display unit 131F on the liquid crystal display 131.

The lamp unit 132 includes various types of warning lamps such as: an engine lamp 132A for indicating an engine abnormality, an engine oil lamp 132B for indicating an abnormality in a lubrication system, a refueling lamp 132C for indicating that the remaining amount of fuel has dropped to or below a setting value, and a battery charge lamp 132D for indicating an abnormality in a charging system.

As shown in FIGS. 11 to 15, the liquid crystal display 131 includes an auxiliary display unit 131G that is located in a free space of its display area and displays information related to the motor generator 103. The auxiliary display unit 131G has four 7-segment display sections each corresponding to one digit. The display ECU 133 includes a control unit 133A for the auxiliary display unit. The control unit 133A causes the first-digit display section of the auxiliary display unit 131G to operate as a first display section 131Ga that displays a character indicating a state of the motor generator 3, and causes the remaining three-digit display sections to operate as second display sections 131Gb that display a numeric value indicating a remaining level of the battery 124.

That is, by merely adding the small and inexpensive auxiliary display unit 131G, which has four 7-segment display sections each corresponding to one digit, in the free space of the liquid crystal display 131, information related to the motor generator 103 can be additionally displayed without increasing the size of the liquid crystal display 131 and without reducing the size of each display unit, such as the vehicle speed display unit 131A.

Figure 13:
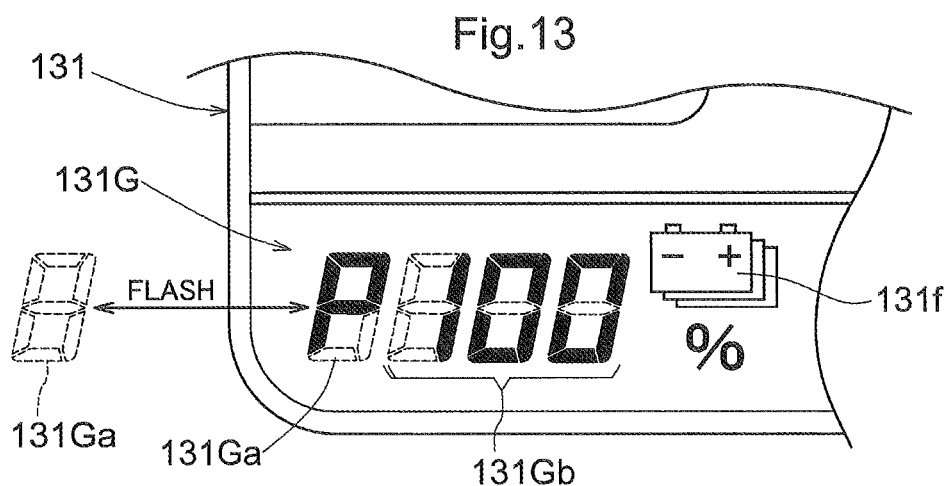

Settings of the auxiliary display unit 131G are configured such that, when the motor generator 103 is in a power running state (powering state) (in which the motor generator 103 is used as the travel motor), the first display section 131Ga of the auxiliary display unit 131G displays "P," which is the initial character of "Power" easily associable with the power running state, through a control operation of the control unit 133A (see FIG. 13). This enables the driver to acknowledge that the motor generator 103 is currently in the power running state.

Figure 14:
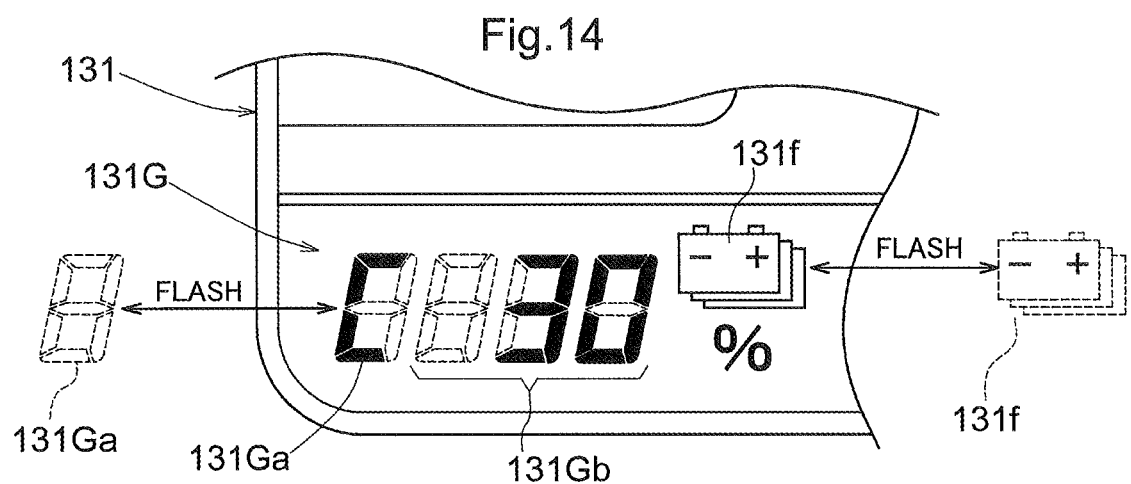

When the motor generator 103 is in a regenerating state (in which the motor generator 103 is used as the electric generator), the first display section 131Ga of the auxiliary display unit 131G displays "C," which is the initial character of "Charge" easily associable with the regenerating state, through a control operation of the control unit 133A (see FIG. 14). This enables the driver to acknowledge that the motor generator 103 is currently in the regenerating state.

Figure 15:
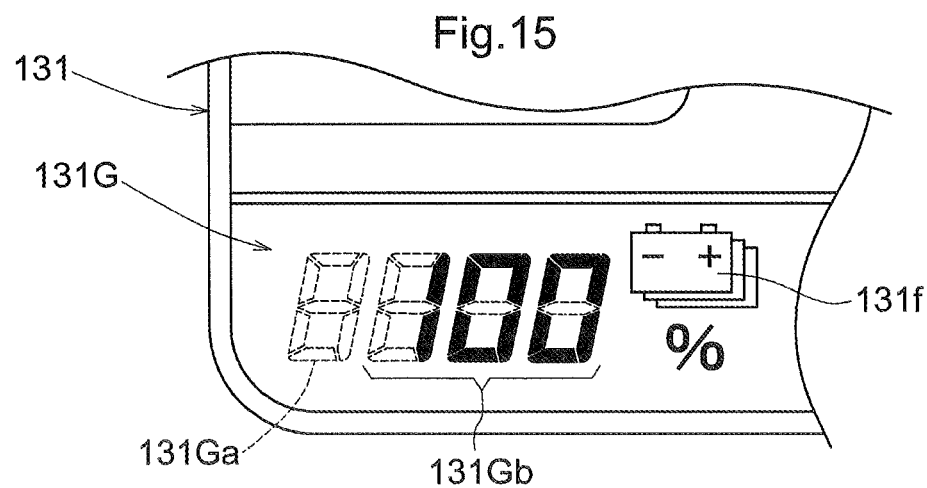

When the motor generator 103 is in neither the power running state nor the regenerating state, the first display section 131Ga of the auxiliary display unit 131G displays nothing through a control operation of the control unit 133A (see FIG. 15). This enables the driver to acknowledge that the motor generator 103 is currently in neither the power running state nor the regenerating state.

The second display sections 131Gb of the auxiliary display unit 131G display the remaining level of the battery 124 in percentage through a control operation of the control unit 133A (see FIGS. 13 to 15). Thus, the driver can be notified of the remaining level of the battery 124.

Therefore, by merely using the liquid crystal display 131 of an inexpensive segmented format and adding the small and inexpensive auxiliary display unit 131G in the free space of the liquid crystal display 131, information related to the engine 102, the state of the motor generator 103 and the remaining level of the battery 124 can be favorably displayed in a manner easily visible to the driver without triggering an increase in the size of the display device 120 and a significant rise in cost.

As shown in FIGS. 13 and 14, the control unit 133A performs flashing control, based on a power level of the motor generator 103, to reduce the flashing interval of the first display section 131Ga as the power level increases.

Accordingly, when the motor generator 103 is in the power running state, the higher the power level in the power running state, the shorter the flashing interval of "P" displayed on the first display section 131Ga, and the quicker the flashes. Conversely, the lower the power level in the power running state, the longer the flashing interval of "P" displayed on the first display section 131Ga, and the slower the flashes. Thus, the driver can be notified of the power level of the motor generator 103 in the power running state.

On the other hand, when the motor generator 103 is in the regenerating state, the higher the power level in the regenerating state, the shorter the flashing interval of "C" displayed on the first display section 131Ga, and the quicker the flashes. Conversely, the lower the power level in the regenerating state, the longer the flashing interval of "C" displayed on the first display section 131Ga, and the slower the flashes. Thus, the driver can be notified of the power level of the motor generator 103 in the regenerating state.

Hence, the power level of the motor generator 103 in the power running state and regenerating state can be displayed in a manner easily visible to the driver without adding a new display unit.

Figure 16:
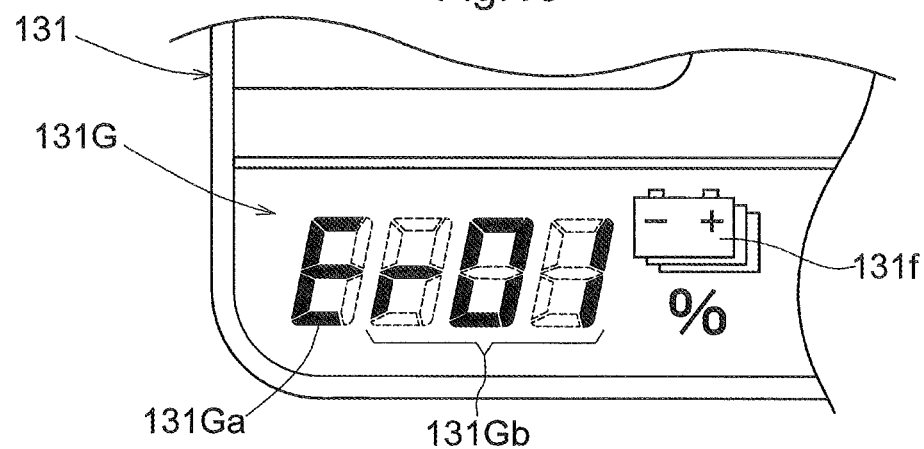
Figure 17:
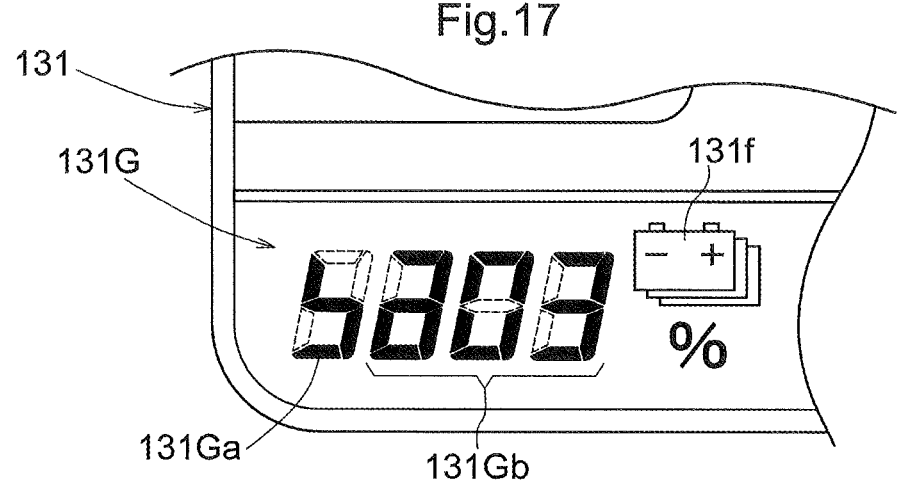

As shown in FIGS. 11, 16, and 17, the control unit 133A performs display switching control, based on information from the main ECU 123, to switch a display state of the auxiliary display unit 131G among a standard information display state for displaying the state of the motor generator 103 and the remaining level of the battery 124, an abnormality information display state for displaying an abnormality in an electric system including the motor generator 103, and a maintenance information display state for displaying information necessary for maintenance of the electric system.

Specifically, upon detecting an abnormality in the electric system such as the motor generator 103 and battery 124, based on information from the main ECU 123, the control unit 133A switches the display state of the auxiliary display unit 131G from the standard information display state to the abnormality information display state. In the abnormality information display state, the auxiliary display unit 131G displays e.g. "Er01" showing the abbreviation of "Error" and a two-digit error code corresponding to the substance of the current abnormality through a control operation of the control unit 133A (see FIG. 16). Thus, the driver can be notified of the fact that the electric system is currently undergoing an abnormality, as well as of the substance of the current abnormality.

Upon detecting that the vehicle body has been manipulated to switch from a normal driving mode to a maintenance mode for performing maintenance on the electric system such as the motor generator 103 and the battery 124, based on information from the main ECU 123, the control unit 133A switches the display state of the auxiliary display unit 131G from the standard information display state to the maintenance information display state. In the maintenance information display state, the auxiliary display unit 131G displays a sensor identifier such as "Sa03" and an AD value through a control operation of the control unit 133A (see FIG. 17). Thus, the driver can be notified of information necessary for maintenance of the electric system.

In this way, the driver can be appropriately notified of an abnormality in the electric system and information necessary for maintenance without adding a new display unit.

An instruction issued to switch the main ECU 123 between the driving mode and maintenance mode may be outputted based on multi-manipulation of two switches among a plurality of switches including the selection switch 127 provided in the boarding/driving section 104, or may be outputted based on manipulation of a switch dedicated for switching between the driving mode and the maintenance mode.

As shown in FIG. 10, the liquid crystal display 131 is mounted on a dashboard 134 with a distance in the rightward direction from an area in which the steering wheel 118 obstructs the driver's field of view, and the liquid crystal display 131 is located at a horizontally central portion of the dashboard 134 in proximity to the driver.

Therefore, various types of information displayed on the liquid crystal display 131 can easily be viewed by the driver without getting obstructed by the steering wheel 118.

As shown in FIGS. 10 and 12, the auxiliary display unit 131G is located at a lower left portion of the liquid crystal display 131, that is, at an end portion of the liquid crystal display 131 closer to the steering wheel.

In other words, on the liquid crystal display 131, the auxiliary display unit 131G is located close to the driver. Therefore, notwithstanding the arrangement of the small auxiliary display unit 131G in the free space of the liquid crystal display 131, information related to the electric system displayed on the auxiliary display unit 131G can easily be viewed by the driver.

As shown in FIGS. 12 to 17, the auxiliary display unit 131G has a battery symbol 131*f* indicative of the battery 124. The control unit 133A performs symbol flashing control to make the battery symbol 131*f* flash when the remaining level of the battery 124 has fallen below setting values (see FIG. 14).

Thus, merely adding the battery symbol 131*f* to the auxiliary display unit 131G enables the driver to acknowledge that the remaining level of the battery 124 has fallen below the setting values.

A first setting value (e.g. 30% of full charge) and a second setting value (e.g. 15% of full charge) that is smaller than the first setting value are set each as a setting value. In the symbol flashing control, the control unit 133A makes the flashing interval of the battery symbol 131*f* shorter when the remaining level of the battery 124 has fallen below the second setting value, than when the remaining level of the battery 124 has fallen below the first setting value.

Thus, by merely setting the first and second setting values as the setting values, the driver can be notified of lowering of the battery 124 in two steps.

This enables a clearer presentation of the degree of lowering of the battery 124 to the driver.

As shown in FIGS. 11, 12, 18 and 19, the display ECU 133 includes a display switching unit 133B that switches a display state of the revolution display unit 131D. Upon selection of the electric mode as the travel drive mode, the display switching unit 133B switches the display state of the revolution display unit 131D from a standard display state for displaying the number of engine revolutions (see FIG. 18) to an auxiliary display state for displaying characters indicating that the electric mode is in effect (see FIG. 19). Upon cancellation of the selection of the electric mode, the display switching unit 33B switches the display state of the revolution display unit 131D from the auxiliary display state to the standard display state.

That is, for the duration of selection of the electric mode, the revolution display unit 131D is in the auxiliary display state. In the auxiliary display state, the revolution display unit 131D displays "ELEC" which is the abbreviation of "ELECTRIC" easily associable with the electric mode, through a control operation of the display switching unit 33B (see FIG. 19). This enables the driver to acknowledge that the current travel drive mode is the electric mode.

On the other hand, for the duration of cancellation of selection of the electric mode, the revolution display unit 131D is in the standard display state. In the standard display state, the revolution display unit 131D displays a numeric value indicating the number of engine revolutions through a control operation of the display switching unit 133B (see FIG. 18). This enables the driver to acknowledge that the current travel drive mode is a mode other than the electric mode, that is, the engine drive mode or hybrid drive mode.

In other words, by efficiently using the revolution display unit 131D that becomes unnecessary in the electric mode, the driver can be notified of whether the travel drive mode is the electric mode or else, without adding a new display unit.

Figure 18:
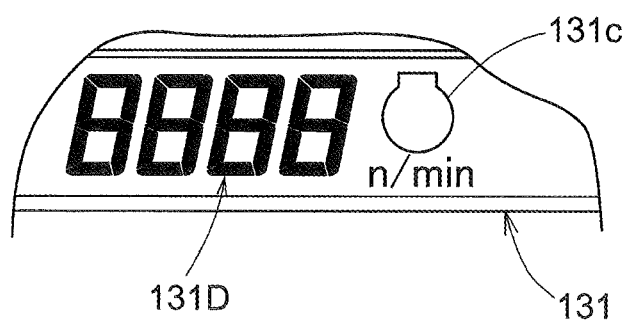
Figure 19:
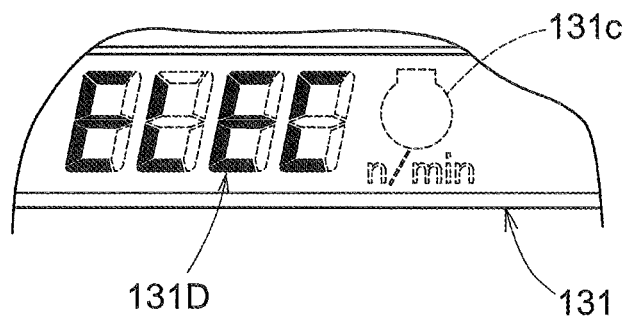
Figure 20:
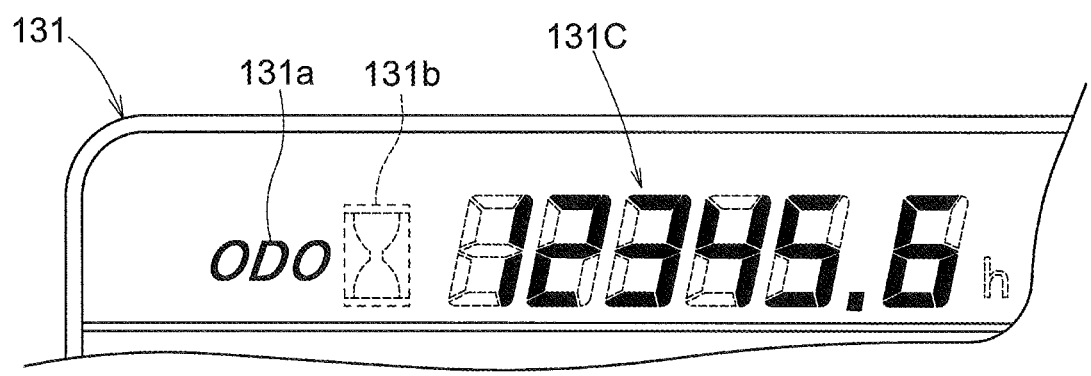
Figure 21:
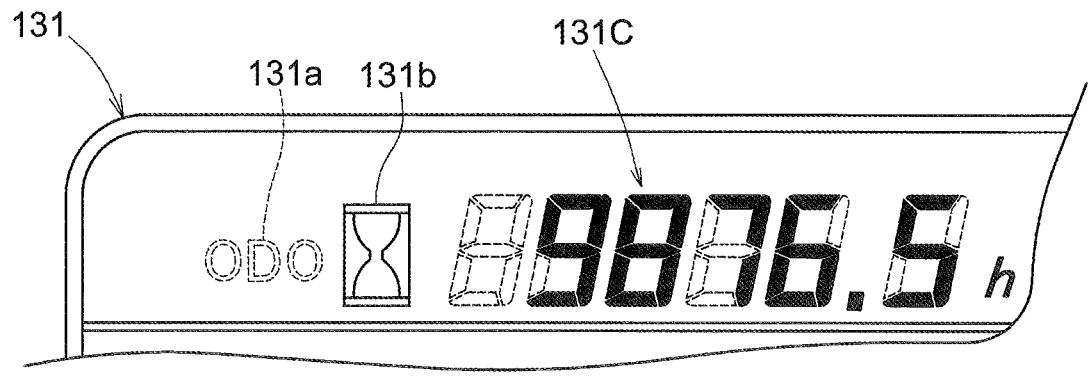

As shown in FIGS. 18 and 19, the display switching unit 133B hides the revolution symbol 131*c*, while the electric mode is being selected as the travel drive mode (see FIG. 19). The display switching unit 133B displays the revolution symbol 131*c* upon cancellation of the selection of the electric mode (see FIG. 18).

This enables the driver to acknowledge whether the current travel drive mode is the electric mode or a mode other than the electric mode, that is, the engine drive mode or hybrid drive mode, in a manner more easily visible to the driver.

As shown in FIGS. 11, 12, 20 and 21, the display device 120 includes a changeover switch 135 that enables switching of information displayed on the cumulative display unit 131C. The display switching unit 133B switches e.g. a display state of the cumulative display unit 131C between a distance display state and a period display state based on manipulation of the changeover switch 135. Specifically, in the distance display state, the display switching unit 133B hides the period symbol 131*b* and a time unit "h", and displays the distance symbol 131*a*; and further displays a cumulative distance traveled on the cumulative display unit 131C (see FIG. 20). In the period display state, the display ECU 133 hides the distance symbol 131*a* and displays the period symbol 131*b* and the time unit "h"; and further displays a cumulative period of engine operation on the cumulative display unit 131C (see FIG. 21).

As shown in FIGS. 10 and 11, an LED alarm lamp 136 is mounted on an upper end portion of a grip 119A of the change speed lever 119 as an alarm 136 that gives notice of the travel drive mode currently selected. The main ECU 123 causes the main control unit 123A to control the operations of the alarm lamp 136. When the travel drive mode currently selected is the electric mode, the main control unit 123A lights the alarm lamp 136. When the travel drive mode currently selected is the engine drive mode, the main control unit 123A makes the alarm lamp 136 flash. When the travel drive mode currently selected is the hybrid drive mode, the main control unit 123A turns off the alarm lamp 136.

That is, notice is given of the travel drive mode currently selected by using the change speed lever 119 that easily comes into the driver's field of view due to its proximity to the steering wheel 118. This enables the driver to acknowledge the travel drive mode currently selected more reliably.

When the alarm lamp 136 is mounted on the steering wheel 118, an electricity system, including the alarm lamp 136, requires a sliding contact that allows the steering wheel 118 to turn. In contrast, when the alarm lamp 136 is mounted on the change speed lever 119, the sliding contact is unnecessary. This can reduce the cost for mounting the alarm lamp 136.

The alarm 136 may be mounted on a portion of the change speed lever 119 other than the grip. The alarm 136 may be an alarm lamp that can change the color of emitted light in accordance with the travel drive mode currently selected, or a 7-segment LED display that displays an abbreviation corresponding to the travel drive mode currently selected, for example.

The main ECU 123 controls the operations of an electronic buzzer 137 mounted on the dashboard 134 through a control operation of the main control unit 123A. When manipulation of switches, including the selection switch 127 provided in the boarding/driving section 104, has been appropriately performed, the main control unit 123A produces a manipulation sound to notify a passenger of whether this manipulation of switches is valid or invalid.

Based on the manipulated state of the changeover switch 138 mounted on the dashboard 134, the main control unit 123A switches between a sound mode in which a manipulation sound is produced and a mute mode in which no manipulation sound is produced.

Thus, the passenger can arbitrarily select the sound mode or mute mode by manipulating the changeover switch 138. This can prevent a manipulation sound from being produced when silence is required.

[Variations of Second Embodiment]

The present invention is not limited to the configurations exemplarily described in the foregoing embodiment. Below, typical variations of the foregoing embodiment of the present invention will be exemplarily described.

(1) The engine 102 may be a diesel engine including a common rail system.

(2) The motor generator 103 may be of an in-wheel type.

(3) The travel device 106 may be of a semi-crawler type with a pair of left and right wheels and a pair of left and right continuous tracks, or may be of a full-crawler type with a pair of left and right continuous tracks.

(4) A NiMH battery (nickel-metal hydride battery) may be used as the battery 124, for example.

(5) Instead of including the temperature display unit 131E and remaining amount display unit 131F, the liquid crystal display 131 of the display device 120 may include a temperature display unit and remaining amount display unit with indicator needles, or an LED temperature display unit and LED remaining amount display unit of a segmented format.

(6) The arrangement of the auxiliary display unit 131G on the liquid crystal display 131 can be changed in various ways depending on the position of a free space of the liquid crystal display 131. For example, if there is a free space on the left of the cumulative display unit 131C on the liquid crystal display 131, the auxiliary display unit 131G may be located to the left of the cumulative display unit 131C. If there is a free space on the left of the speed position display unit 131B on the liquid crystal display 131, the auxiliary display unit 131G may be located to the left of the speed position display unit 131B.

(7) The liquid crystal display 131 may be mounted on the dashboard 134 with a distance in the leftward direction from the area in which the steering wheel 118 obstructs the driver's field of view. In this case, it is desirable that the auxiliary display unit 131G be located at a right end portion of the liquid crystal display 131, that is, at an end portion of the liquid crystal display 131 closer to the steering wheel.

(8) The display ECU 133 may, through a control operation of the control unit 133A, cause the fourth-digit display section of the auxiliary display unit 131G to operate as a first display section 131Ga that displays a character indicating a state of the motor generator 3, and cause the remaining three-digit display sections to operate as second display sections 131Gb that display a numeric value indicating the remaining level of the battery 124.

(9) In the flashing control to reduce the flashing interval of the first display section 131Ga as the power level of the motor generator 103 increases, the control unit 133A for the auxiliary display unit may continuously light the first display section 131Ga when the power level of the motor generator 103 has reached its maximum value.

(10) The control unit 133A for the auxiliary display unit may not perform the flashing control to reduce the flashing interval of the first display section 131Ga as the power level of the motor generator 103 increases.

(11) In the symbol flashing control to make the battery symbol 131f flash when the remaining level of the battery 124 has fallen below the setting values, the control unit 133A for the auxiliary display unit may make the unit of the remaining battery level ("%" in FIGS. 12 to 15), which is adjacent to the battery symbol 131f, flash together with the battery symbol 131f.

(12) Various changes can be made to a setting value used in the symbol flashing control. For example, a value equivalent to 25% of full charge may be set as the setting value.

(13) A setting value used in the symbol flashing control may be, for example, only one of the aforementioned first and second setting values. A third setting value may be used in addition to the first and second setting values to notify the driver of lowering of the battery 124 in three steps.

(14) Upon selection of the hybrid drive mode as the travel drive mode, the display switching unit 133B may switch the display state of the revolution display unit 131D in accordance with a travel state that is automatically switched through a control operation of the main ECU 123 based on, for example, the control program for hybrid.

In this case, when the travel state has been automatically switched to an electric state for driving the travel device 106 using power from the motor generator 103 alone through a control operation of the main ECU 123 in the hybrid drive mode, for example, the display switching unit 133B switches the display state of the revolution display unit 131D from the standard display state for displaying the number of engine revolutions to the auxiliary display state for displaying characters indicating that the electric mode (electric state) is in effect. When the travel state has been automatically switched to an engine drive state for driving the travel device 106 using power from the engine 102 alone, or to a hybrid drive state for driving the travel device 106 using the combination of power from the motor generator 103 and power from the engine 102, through a control operation of the main ECU 123 in the hybrid drive mode, the display switching unit 133B switches the display state of the revolution display unit 131D from the auxiliary display state to the standard display state.

By thus efficiently using the revolution display unit 131D that becomes unnecessary in the electric state of the hybrid drive mode, the driver can be notified of whether the current travel state in the hybrid drive mode is the electric state or another state, that is, the engine drive state or hybrid drive state, without adding a new display unit.

(15) When the revolution display unit 131D is in the auxiliary display state, the display switching unit 133B may cause the revolution display unit 131D to display "batt" or "bAtt," which is the abbreviation of "battery" easily associable with the electric mode, for example, or display "SLnt" or "StLt," which is the abbreviation of "silent" meaning silence or "stealth".

(16) The display switching unit 133B may always display the revolution symbol 131c, whether the electric mode has been selected as the travel drive mode or such a selection has been canceled.

(17) The display switching unit 133B may display a cumulative distance traveled on the cumulative display unit 131C while the electric mode is being selected as the travel drive mode, and may display a cumulative period of engine operation on the cumulative display unit 131C while the engine drive mode or hybrid drive mode is being selected as the travel drive mode.

The display switching unit 133B may hide the period symbol 131b, display the distance symbol 131a, and display a cumulative distance traveled on the cumulative display unit 131C while the electric mode is being selected as the travel drive mode, and may hide the distance symbol 131a, display the period symbol 131b, and display a cumulative period of engine operation on the cumulative display unit 131C while the engine drive mode or hybrid drive mode is being selected as the travel drive mode.

(18) Symbols displayed on the liquid crystal display 131 of the display device 120 may vary depending on, for example, the specification of a work vehicle on which the display device 120 is mounted.

Figure 22:
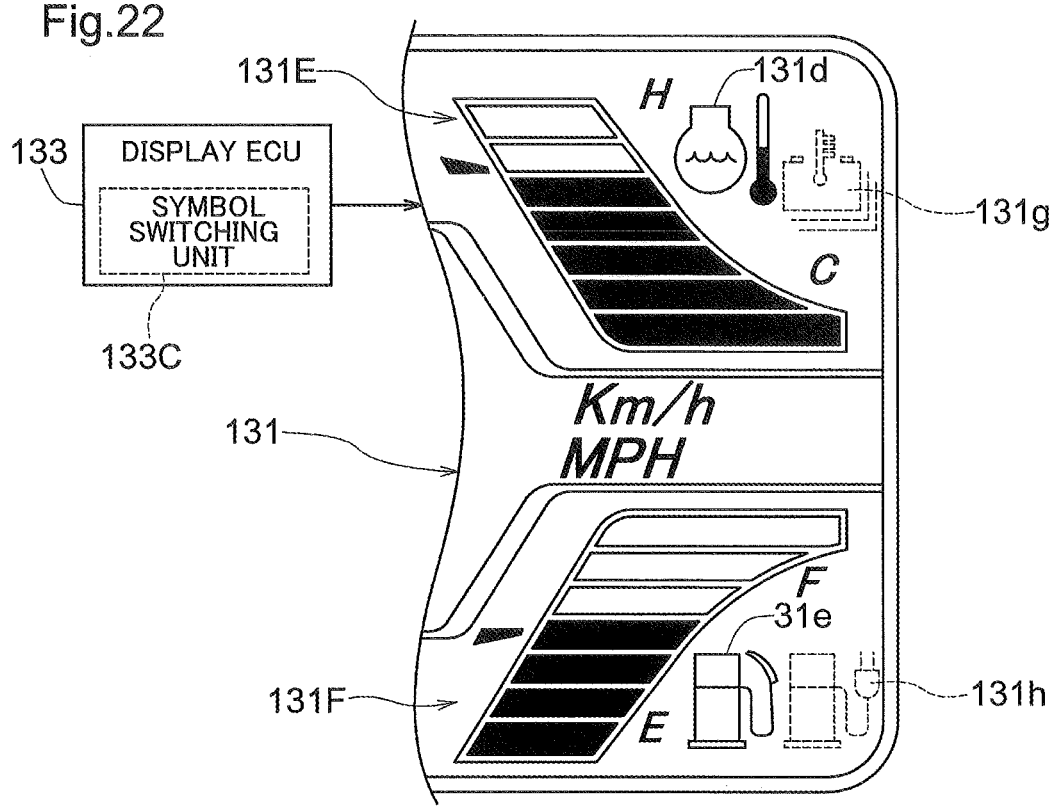
Figure 23:
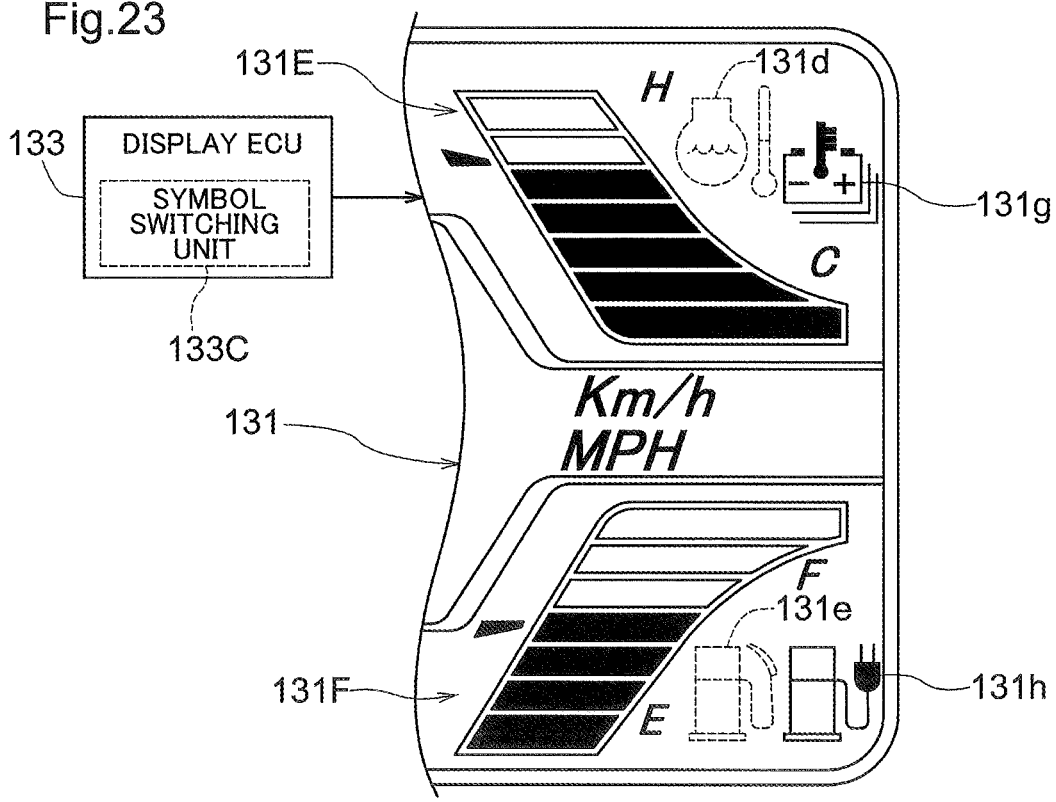

Specifically, as shown in FIGS. 22 and 23, the coolant temperature symbol 131d indicating a temperature of the engine coolant and a cell temperature symbol 131g indicating a temperature of battery cells are located adjacent to the temperature display unit 131E on the liquid crystal display 131 of the display device 120. Furthermore, the refueling symbol 131e indicating refueling and a charging symbol 131h indicating charging are located adjacent to the remaining amount display unit 131F. The display ECU 133 includes a symbol switching unit 133C that switches symbols to be displayed. In an on-board state in which information related to the engine 2 is obtainable, the symbol switching unit 133C hides the cell temperature symbol 131g and charging symbol 131h, and displays the coolant temperature symbol 131d and refueling symbol 131e. In an on-board state in which information related to the engine 102 is unobtainable, the coolant temperature symbol 131d and refueling symbol 131e are hidden, and the cell temperature symbol 131g and charging symbol 131h are displayed.

In this case, when the work vehicle includes only the engine 102 as its power source, or includes the engine 102 and motor generator 103 as its power sources, for example, the on-board state in which information related to the engine 102 is obtainable is in effect, and thus the symbol switching unit 133C hides the cell temperature symbol 131g and charging symbol 131h, and displays the coolant temperature symbol 131d and refueling symbol 131e. This enables the driver to acknowledge that information displayed on the temperature display unit 131E indicates the temperature of the engine coolant, and information displayed on the remaining amount display unit 131F indicates the remaining amount of fuel. Thus, the driver can be notified of the temperature of the engine coolant and the remaining amount of fuel.

On the other hand, when the work vehicle includes only the electric motor or motor generator 103 as its power source, the work vehicle is in the on-board state in which information related to the engine 102 is unobtainable, and thus the symbol switching unit 133C hides the coolant temperature symbol 131d and refueling symbol 131e, and displays the cell temperature symbol 131g and charging symbol 131h. This enables the driver to acknowledge that information displayed on the temperature display unit 131E indicates the temperature of the battery cells, and information displayed on the remaining amount display unit 131F indicates the remaining level of the battery 124. Thus, the driver can be notified of the temperature of the battery cells and the remaining level of the battery 124.

In other words, a single display device 120 is commonly mountable on an engine work vehicle, a hybrid work vehicle, and an electric work vehicle.

This is advantageous in terms of cost and management of components, for example, compared with a case in which different types of work vehicles are respectively provided with display devices 120 specifically tailored thereto.

It goes without saying that, when the coolant temperature symbol 131d is displayed and the cell temperature symbol 131g is hidden, the display ECU 133 displays the temperature of the engine coolant on the temperature display unit 131E. When the cell temperature symbol 131g is displayed and the coolant temperature symbol 131d is hidden, the display ECU 133 displays the temperature of the battery cells on the temperature display unit 131E.

When the refueling symbol 131e is displayed and the charging symbol 131h is hidden, the display ECU 133 displays the remaining amount of fuel on the remaining amount display unit 131F. When the charging symbol 131h is displayed and the refueling symbol 131e is hidden, the display ECU 133 displays the remaining level of the battery 24 on the remaining amount display unit 131F.

(19) Instead, the display device 120 according to variation (18) may include a first input unit to which information related to the engine 102 is inputted, and a second input unit to which information related to the electric motor or motor generator 103 is inputted, for example. In this case, the symbol switching unit 133C may determine the effectiveness of the on-board state in which information related to the engine 102 is obtainable when a communication line is connected to the first input unit or to both of the first and second input units, and determine the effectiveness of the on-board state in which information related to the engine 102 is unobtainable when the communication line is connected only to the second input unit.

(20) Instead, the display device 120 according to variation (18) may include a manipulation member that notifies the symbol switching unit 133C of the effectiveness of the on-board state in which information related to the engine 102 is obtainable, for example. In this case, the symbol switching unit 133C may determine an on-board state of the display device 120 based on manipulation of the manipulation member.

(21) In the display device 120 according to variation (18), the symbol switching unit 133C may switch symbols to be displayed on the liquid crystal display 131 in accordance with the travel drive mode currently selected.

In this case, for example, while the electric mode is being selected as the travel drive mode, the symbol switching unit 133C hides the coolant temperature symbol 131d and refueling symbol 131e, and displays the cell temperature symbol 131g and charging symbol 131h. While the engine drive mode or hybrid drive mode is being selected as the travel drive mode, the symbol switching unit 133C hides the cell temperature symbol 131g and charging symbol 131h, and displays the coolant temperature symbol 131d and refueling symbol 131e.

(22) The present invention is applicable to a display device that is mounted on a work vehicle, such as a multipurpose work vehicle, tractor and mower, and that includes a liquid crystal display provided with a plurality of display units that display information related to an engine in a segmented format, and a display electronic control unit that controls the operations of the liquid crystal display.

What is claimed is:
1. A plug-in hybrid work vehicle, comprising:
a prime mover unit comprising an engine and an electric motor, the prime mover unit configured for transmitting power to at least one wheel of the work vehicle;
an electronic control unit that controls on-board electric components;
a first battery charged using electric power from an on-board electric generator or an external electric power source, the first battery configured for starting the engine;
a second battery charged from the external electric power source via a charger, the second battery configured for supplying power to the electric motor;

a charging switch that instructs the electronic control unit to start charging the first battery or the second battery from the external electric power source; and a DC-to-DC converter that converts an output voltage of the charger into a voltage corresponding to the first battery, and outputs a resultant voltage to the first battery, wherein the electronic control unit includes a voltage determination unit that determines whether an output voltage of the first battery exceeds a reference voltage value necessary for starting the engine, and a charging control unit that controls charging of the first battery and the second battery from the external electric power source, and during charging from the external electric power source, the charging control unit performs first charging control to charge the second battery from the external electric power source when the voltage determination unit determines that the output voltage of the first battery exceeds the reference voltage value, and performs second charging control to charge only the first battery from the external electric power source via the DC-to-DC converter, in preference to the first charging control, when the voltage determination unit determines that the output voltage of the first battery is equal to or lower than the reference voltage value.

2. The plug-in hybrid work vehicle according to claim 1, further comprising a main switch that permits/interrupts application of current to the electric components including the electronic control unit, wherein the charging switch permits/interrupts application of current from the first battery to the electronic control unit, the electronic control unit further includes a permission/interruption discriminating unit that determines whether the main switch is in a blocking state for permitting application of current to the electric components, or in a connecting state for interrupting application of current to the electric components, and wherein when the permission/interruption discriminating unit determines that the main switch is in the blocking state, the charging control unit holds the charging switch in a connecting state and performs the first charging control or the second charging control, and when the permission/interruption discriminating unit determines that the main switch is in the connecting state, the charging control unit does not hold the charging switch in the connecting state and performs neither the first charging control nor the second charging control.

3. The plug-in hybrid work vehicle according to claim 1, further comprising:

a connector for external charging, wherein the connector and the charging switch are disposed in a storage compartment that is opened and closed via a hood.

4. The plug-in hybrid work vehicle according to claim 3, wherein the hood is openable and closable about a swing pivot of the hood, and the connector and the charging switch are disposed at positions adjacent the swing pivot.

5. The plug-in hybrid work vehicle according to claim 1, further comprising:

a main switch that permits/interrupts application of current to the electric components including the electronic control unit, wherein the charging switch includes a self-holding circuit that can hold a connecting state in which current can be applied from the first battery to the electronic control unit, the electronic control unit further includes a permission/interruption discriminating unit that determines whether the main switch is in a blocking state for permitting application of current to the electric components, or in a connecting state for interrupting application of current to the electric components, and when the permission/interruption discriminating unit determines that the main switch is in the blocking state, the charging control unit holds the charging switch in a connecting state by applying current to the self-holding circuit and performs the first charging control or the second charging control, and when the permission/interruption discriminating unit determines that the main switch is in the connecting state, the charging control unit does not apply current to the self-holding circuit, whereby the charging control unit does not hold the charging switch in the connecting state, and performs neither the first charging control nor the second charging control.

* * * * *

UNITED STATES PATENT AND TRADEMARK OFFICE
CERTIFICATE OF CORRECTION

PATENT NO. : 10,717,361 B2
APPLICATION NO. : 15/374205
DATED : July 21, 2020
INVENTOR(S) : Masaaki Nishinaka et al.

Page 1 of 1

It is certified that error appears in the above-identified patent and that said Letters Patent is hereby corrected as shown below:

In the Specification

Column 1, Line 10, before February 25, 2016, insert -- and --

Signed and Sealed this
Seventeenth Day of November, 2020

Andrei Iancu
*Director of the United States Patent and Trademark Office*